(12) United States Patent
Rauner

(10) Patent No.: US 10,531,266 B2
(45) Date of Patent: Jan. 7, 2020

(54) EMERGENCY MESSAGING SYSTEM AND METHOD OF RESPONDING TO AN EMERGENCY

(71) Applicant: SirenGPS, LLC, St. Louis, MO (US)

(72) Inventor: Paul A. Rauner, St. Louis, MO (US)

(73) Assignee: SirenGPS, LLC, St. Louis, MO (US)

( * ) Notice: Subject to any disclaimer, the term of this patent is extended or adjusted under 35 U.S.C. 154(b) by 0 days.

(21) Appl. No.: 16/241,799

(22) Filed: Jan. 7, 2019

(65) Prior Publication Data

US 2019/0166480 A1 May 30, 2019

Related U.S. Application Data

(63) Continuation of application No. 15/865,245, filed on Jan. 8, 2018, now Pat. No. 10,178,537, which is a
(Continued)

(51) Int. Cl.
| | |
|---|---|
| *H04W 4/90* | (2018.01) |
| *H04W 4/029* | (2018.01) |
| *H04W 4/12* | (2009.01) |
| *H04W 8/20* | (2009.01) |
| *G06F 17/27* | (2006.01) |
| *G08B 27/00* | (2006.01) |
| *H04W 4/02* | (2018.01) |
| *H04W 4/08* | (2009.01) |
| *G08B 25/00* | (2006.01) |
| *G08B 25/01* | (2006.01) |
| *G08B 25/10* | (2006.01) |

(52) U.S. Cl.
CPC .......... *H04W 4/90* (2018.02); *G06F 17/2765* (2013.01); *G08B 25/006* (2013.01); *G08B 25/016* (2013.01); *G08B 25/10* (2013.01); *G08B 27/001* (2013.01); *G08B 27/003* (2013.01); *H04W 4/023* (2013.01); *H04W 4/029* (2018.02); *H04W 4/08* (2013.01); *H04W 4/12* (2013.01); *H04W 8/20* (2013.01)

(58) Field of Classification Search
CPC .................................. H04W 4/22; H04W 4/90
USPC ........................................... 455/404.1, 404.2
See application file for complete search history.

(56) References Cited

U.S. PATENT DOCUMENTS

| | | |
|---|---|---|
| 6,600,812 B1 | 7/2003 | Gentillin et al. |
| 2002/0068599 A1 | 6/2002 | Rodriguez et al. |
| (Continued) | | |

*Primary Examiner* — Joel Ajayi
(74) *Attorney, Agent, or Firm* — Creativenture Law, LLC; Dennis J M Donahue, III; Kevin C. Staed

(57) ABSTRACT

An emergency response computer system is used in operative communication with mobile computing devices for a set of device users to automatically coordinate emergency responders. The system can produce a report for emergency responders that identifies the locations of mobile computing devices, and the report can be helpful in identifying the locations of people and evacuating them when there is a mass emergency. The system can evaluate the content of emergency messages as well as proximity of the locations of the mobile computing devices that sent the emergency messages and the timing of the emergency messages to determine whether a mass emergency event is occurring and the appropriate level and type of emergency responders (police, fire, and/or medical). The system can identify and connect with video cameras throughout the geographic area that is covered by the system's emergency responders.

20 Claims, 20 Drawing Sheets

Related U.S. Application Data continuation-in-part of application No. 14/369,147, filed as application No. PCT/US2012/064514 on Nov. 9, 2012, now Pat. No. 9,867,023.

(60) Provisional application No. 61/594,648, filed on Feb. 3, 2012, provisional application No. 61/558,301, filed on Oct. 10, 2011, provisional application No. 61/558,312, filed on Oct. 10, 2011.

(56) References Cited

U.S. PATENT DOCUMENTS

| | | |
|---|---|---|
| 2007/0218895 A1 | 9/2007 | Saito et al. |
| 2008/0284587 A1 | 11/2008 | Saigh et al. |
| 2010/0159976 A1 | 6/2010 | Marocchi et al. |
| 2012/0257729 A1 | 10/2012 | Piett et al. |

USER COMMUNICATION — 841

10 OCT 11 10:32AM
USERA (202)555-1212 USERA@SUBSCRIBER.EDU

A fire alarm is going off in C.Hall, is this for real?

10 OCT 11 10:36AM
USERB (202)555-1212 USERB@SUBSCRIBER.EDU

Have received your instructions regarding the fire drill. Doors are closed and we are in C. Lawn. Waiting for all clear from the fire department.

10 OCT 11 10:37AM
USERA (202)555-1212 USERA@SUBSCRIBER.EDU

Sorry, got instructions from our RM and we are evacuating as requested

10 OCT 11 10:37AM
USERB (202)555-1212 USERB@SUBSCRIBER.EDU

Fire department has given the clear to return to C. Hall after successful drill and all clear.

CAMPUS INTERFACE — 842

LOCATIONS

- 31 Administration Bldg
- 22 Admission Hall
- 33 A. Hall
- 01 A. Court
- 24 Alumni Memorial Hall
- 18 Alumni Relations
- 34 Intramural Field
- 03 Athletic Practice
- 40 Athletic Office
- 39 B. Center
- 19 Bookstore
- 35 Campus Building
- 17 Center for the Arts
- 26 Government Learning Center
- 28 Computer Center
- 41 College Relations
- 14 Development Office
- 42 Professional Center
- 08 Masters Hall
- 29 Health & Counseling Center
- 09 Residential Learning
- 06 Chapel
- 12 K.L. Field
- 13 C. Hall
- 39 Library
- 30 Memorial Chapel
- 05 D. Hall
- 10 Multifaith Center
- 04 E. Hall
- 38 Pool
- 11 Public Safety
- 02 R. Field
- 37 Sports Center
- 20 Science Center
- 25 Science Field
- 36 Stadium
- 15 C. Lawn
- 21 Si. Chapel
- 07 G. Hall
- 16 Tennis Facility

USER COMMUNICATION 841

10 OCT 11 10:32AM
USERA(202)555-1212 USERA@SUBSCRIBER.EDU

A fire alarm is going off in C.Hall, is this for real?

10 OCT 11 10:36AM
USERB(202)555-1212 USERB@SUBSCRIBER.EDU

Have received your instructions regarding the fire drill. Doors are closed and we are in C.Lawn. Waiting for all clear from the fire department.

10 OCT 11 10:37AM
USERA(202)555-1212 USERA@SUBSCRIBER.EDU

Sorry, got instructions from our RM and we are evacuating as requested

10 OCT 11 10:37AM
USERB(202)555-1212 USERB@SUB...

Fire department has given th...
after successful drill and al...

CAMPUS INTERFACE 842

1450
UCOMM USERB(202)555-1212 USERB@SUBSCRIBER.EDU
USER LOCATION [LAT/LONG][SUBSCRIBER LOCATION TAG]

SD Oct 2011-10:11AM

Thank you for your assistance with the fire drill. Please inform everyone that they can now return to C. Hall and thank them for their cooperation.

-Admin

[SEND] [CANCEL]

LOCATIONS

- 31 Administration Bldg
- 22 Admission
- 33 A. Hall
- 01 A. Court
- 24 Alumni Memorial Hall
- 18 Alumni Relations
- 34 Intramural Field
- 30 Athletic Practice
- 40 Athletic Office
- 39 B. Center
- 19 Bookstore
- 35 Campus Building
- 17 Center for the Arts
- 28 Government Learning Center
- 20 Computer Center
- 41 College Relations
- 14 C. Hall
- 42 Development Office
- 08 Professional Center
- 29 Master's Hall
- 06 Health & Counseling Center
- 13 Residential Learning
- 27 Chapel
- 05 K. Field
- 12 C. Hall
- 13 Library
- 32 Memorial Chapel
- 03 D. Hall
- 10 Multifaith Center
- 04 E. Hall
- 38 Pool
- 11 Public Safety
- 07 J. Field
- 37 Sports Center
- 23 Science Center
- 25 Science Field
- 36 Stadium
- 15 Lawn
- 21 St. Chapel
- 26 G. Chapel
- 07 Tennis Facility
- 16 L. Hall

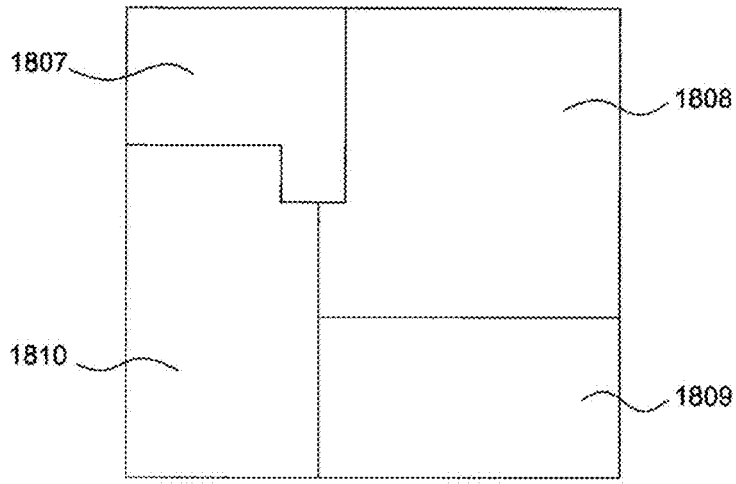
FIG. 18A
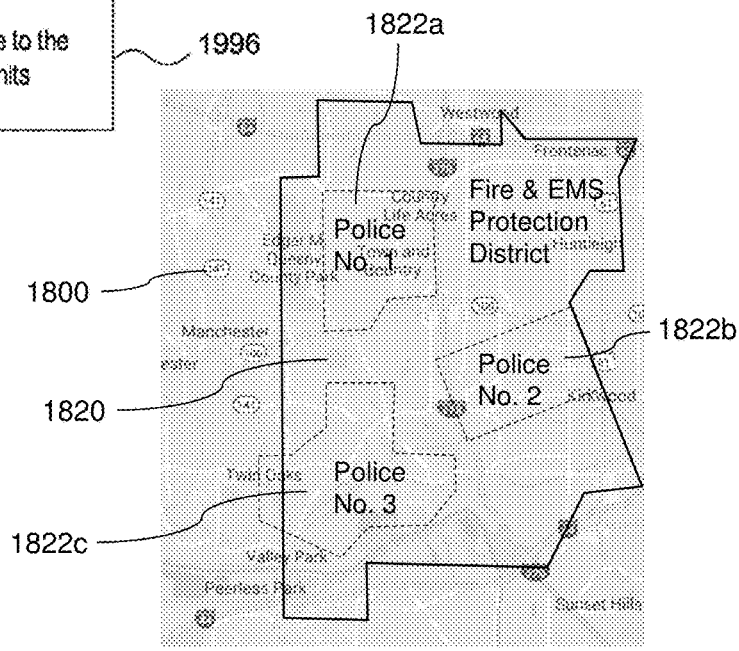
FIG. 18B
FIG. 19

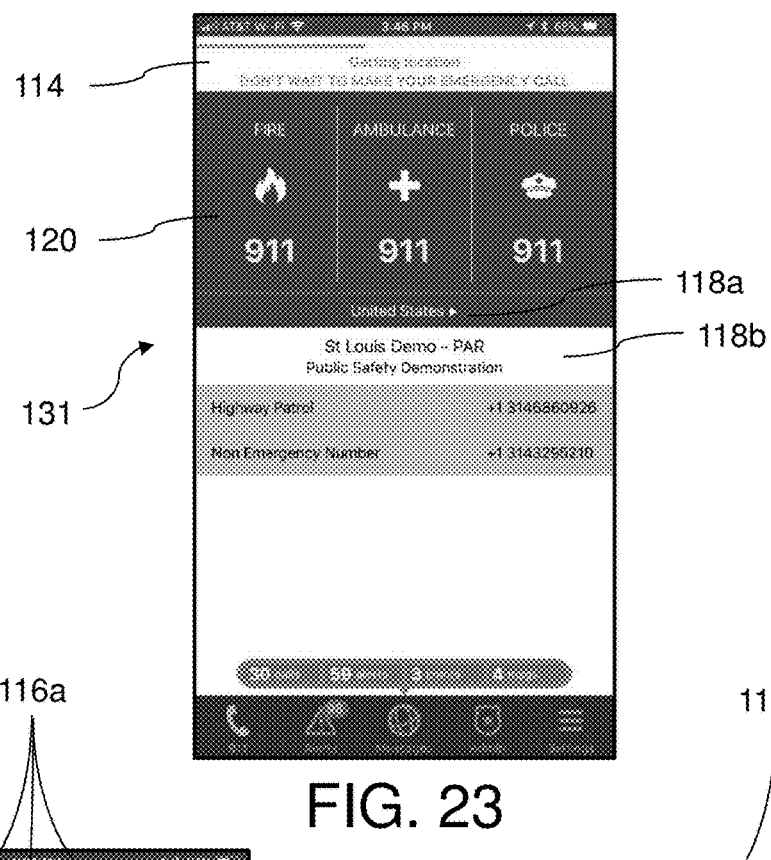
FIG. 23
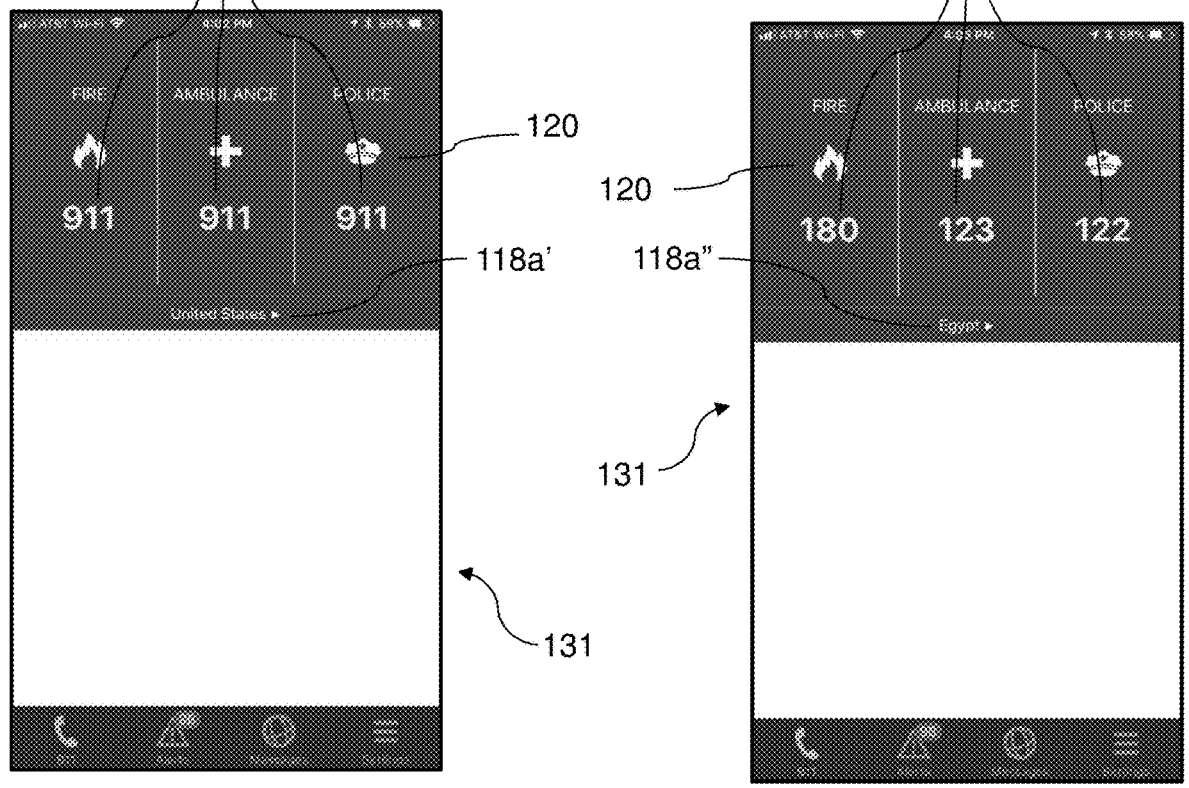
FIG. 24A
FIG. 24B

EMERGENCY MESSAGING SYSTEM AND METHOD OF RESPONDING TO AN EMERGENCY

CROSS-REFERENCE TO RELATED APPLICATIONS

This application is a continuation of U.S. patent application Ser. No. 15/865,245 filed on Jan. 8, 2018 which is a continuation-in-part of U.S. patent application Ser. No. 14/369,147 filed on Jun. 26, 2014 and issued as U.S. Pat. No. 9,867,023 on Jan. 9, 2018 which is a national phase application of PCT Application No. US2012/064514 filed on Nov. 9, 2012 and which claims the benefit of U.S. Provisional Application Nos. 61/558,312, 61/558,301, and 61/594,648, filed on Nov. 10, 2011, Nov. 10, 2011, and Feb. 3, 2012, respectively, and all of which are incorporated herein by reference.

STATEMENT REGARDING FEDERALLY SPONSORED RESEARCH

Not Applicable.

APPENDIX

Not Applicable.

BACKGROUND OF THE INVENTION

Field of the Invention

This invention relates generally to emergency response services (EMS) systems and methods, and relates more particularly to EMS computer systems and methods of responding to an emergency.

Related Art

Telecommunication services, particularly remote computing devices, are essential public safety tools. During emergencies, remote computing devices are indispensable for contacting the appropriate response units (e.g., police or fire) or authorities, and for distributing of emergency messages. Accordingly, a need or potential for benefit exists for an improved emergency messaging system.

SUMMARY OF THE INVENTION

An emergency response computer system is used in operative communication with mobile computing devices for a set of device users to automatically coordinate emergency responders. In one aspect of the invention, the system produces a report for emergency responders to identify the locations of mobile computing devices; the report can be helpful in identifying the locations of people and evacuating them when there is a mass emergency. In another aspect of the invention, the system evaluates the content of emergency messages as well as proximity of the locations of the mobile computing devices that sent the emergency messages and the timing of the emergency messages to determine whether a mass emergency event is occurring and the appropriate level and type of emergency responders (police, fire, and/or medical). In yet another aspect of the invention, the system identifies and connects with video cameras throughout the geographic area that is covered by the system's emergency responders.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 8-14 illustrate exemplary examples of map interfaces of the computer system of FIG. 1, according to the first embodiment.

FIGS. 18A and 18B illustrate an example of a map of a geographic association of locations and emergency response units, according to an embodiment.

FIG. 19 illustrates a flow chart for an exemplary embodiment of an activity of processing the emergency trigger messages, according to the second embodiment.

FIG. 23 illustrates a UI display with optimized location.

FIGS. 24A and 24B illustrate updated emergency numbers in a new country.

DETAILED DESCRIPTION OF THE PREFERRED EMBODIMENTS

Figure 1:
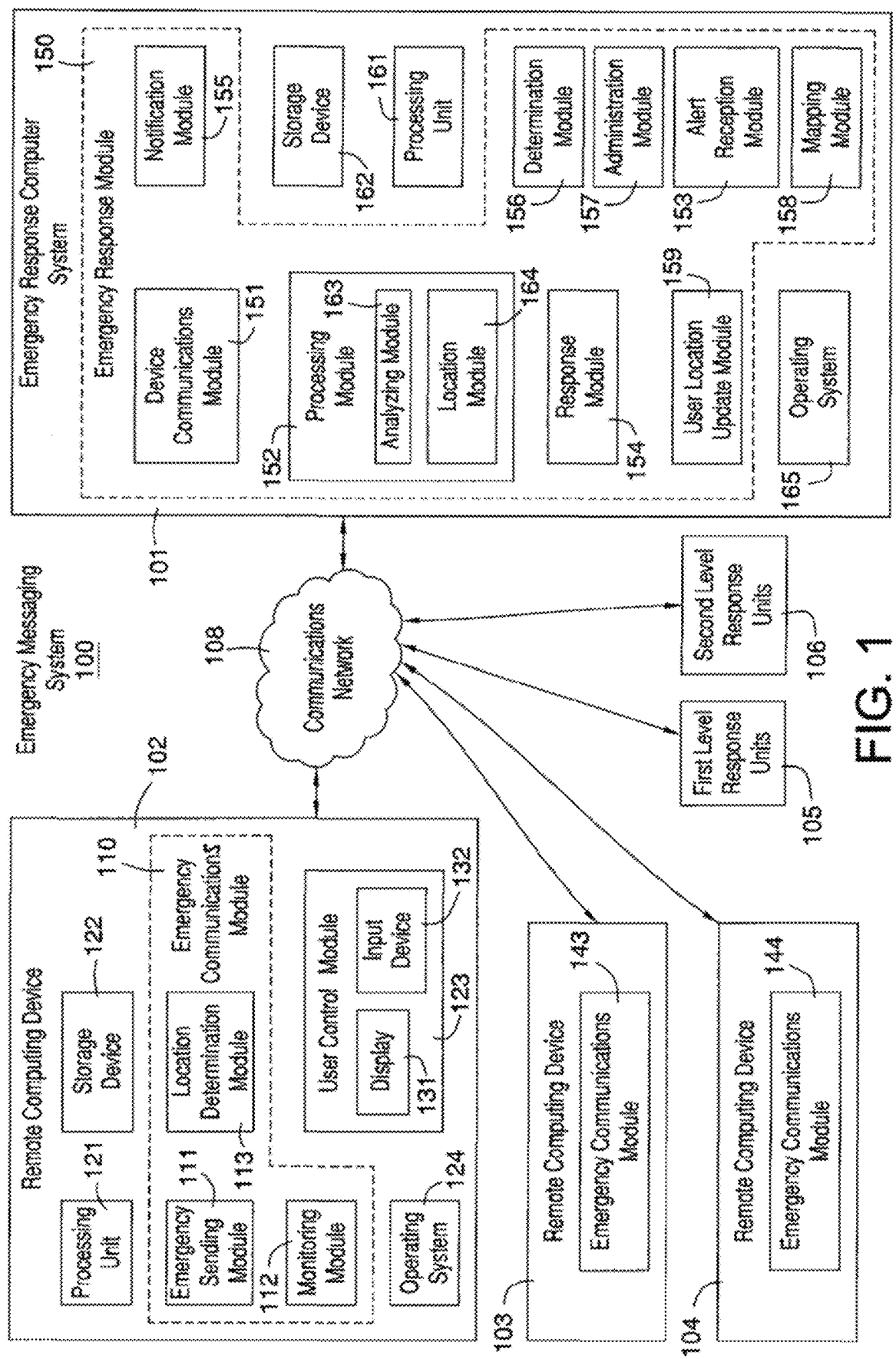
FIG. 1 illustrates a block diagram of an emergency messaging system, according to a first embodiment.

The following description of the preferred embodiment(s) is merely exemplary in nature and is in no way intended to limit the invention, its application, or uses. Some embodiments teach a method of responding to an emergency using an emergency response computer system. The emergency response computer system having a processing unit and an emergency response module is networked communication with public-safety answering point (PSAP) computers. Accordingly, in the preferred embodiment of the invention, the emergency response computer system operates as a cloud computing environment which is accessed by the PSAP computers through an online browser application. It will be appreciated that the emergency response computer system could run on resident PSAP computers although this is not the preferred operating environment. Generally, the emergency response computer system is hosted in the cloud and is accessed by the PSAP computers through a web browser interface.

The method including: receiving in the emergency response module one or more emergency trigger messages from one or more remote computing devices, the emergency response module running on the processing unit; using the emergency response module to process the one or more emergency trigger messages to determine an emergency level, using the emergency response module to process the one or more emergency trigger messages including: determining locations of at least a portion of the one or more remote computing devices; analyzing the one or more emergency trigger messages to determine a content of the one or more emergency trigger messages; determining a level of response to the one or more emergency trigger messages based upon the locations of the at least the portion of the one or more remote computing devices and the content of the one or more emergency trigger messages, the levels of response comprise a first level response and a second level response; using the locations of the at least the portion of the one or more remote computing devices to determine a first response unit to notify; using the locations of the at least the portion of the one or more remote computing devices to determine a second response unit to notify if the level of response is the second level of response; using the emergency response module to notify the first response unit if the level of response is the first level of response or the second level of response; using the emergency response module to notify the second level response unit if the level of response is the second level of response; receiving in the emergency response module instructions from the second level response unit to notify a target group if the level of response is the second level of response; and using the emergency response module to send a first emergency alert message to the target group if the level of response is the second level of response.

Further embodiments concern a method of responding to an emergency using a mobile computing device. The mobile computing device can have a first processor and an emergency module. The method can include: receiving a first emergency trigger message in the emergency module from a user of the mobile computing device, the emergency module running on the first processor; sending a second emergency trigger message to an emergency response computer system using the emergency module; sending location information to the emergency response computer system using the emergency module; receiving in the emergency module a request for updated location information from the emergency response computer system; sending updated location information to the emergency response computing system using the emergency module; and receiving in the emergency module a mass emergency message from the emergency response computer system.

In other embodiments, an emergency messaging system can be configured to be used with three or more first computing devices. The emergency messaging system can include: (a) a device communications module configured to run on a first processor and further configured to communicate with two or more sending computing devices, the device communications module further configured to receive two or more emergency trigger messages from one or more users via the two or more sending computing devices; (b) a processing module configured to run on the first processor and further configured to process the two or more emergency trigger messages to determine an emergency level, the processing module can have: (1) a location module configured to determine a location of at least a first portion of the three or more first computing devices; (2) an analyzing module configured to analyze the two or more emergency trigger messages to determine a content of the two or more emergency trigger messages; (3) a response module configured to determine a level of response to the two or more emergency trigger messages based upon a location of the two or more sending computing devices and the content of the two or more emergency trigger messages, the levels of response comprise a first level response and a second level response; (4) a determination module configured to use the location of at least a second portion of the two or more sending computing devices to determine an appropriate first response unit to notify and an appropriate second response unit to notify; and (5) a notification module configured to run on the first processor and further configured to notify the appropriate first response unit and the appropriate second level response unit. In some examples, the three or more first computing devices comprise the two or more sending computing devices.

Various embodiments can concern method of providing messaging service to one or more users of one or mobile computing devices. The method can include: facilitating a use of a first mobile computing device to send a first trigger message, facilitating the use of the first mobile computing device to send the first trigger message can include: receiving a location of the first mobile computing device from a global positioning module, the global positioning module running on the first mobile computing device; receiving a first trigger message from a user of the first computing device; and wirelessly transmitting the first trigger message and the location of the first mobile computing device to a response module running on at least one second processor of a first server; receiving the first trigger message in response module; determining a first response unit associated with the first location of the first mobile computing device; and transmitting the first trigger message to the first response unit associated with the location of the first mobile computing device. The one or more users of the one or more mobile computing device comprise the first user. The one or more mobile computing device comprises the first mobile computing device.

Still other embodiments can concern an emergency messaging system configured to be used with the two or more mobile computing devices. The emergency messaging system can include: a device communications module configured to run on at least one first processor and further configured to communicate with the two or more mobile computing devices, the device communications module further configured to receive a first emergency trigger message from a user of a first one of the two or more mobile computing devices, the first trigger message comprises a location of the first one of the two or more mobile computing devices; a determination module configured to run on the at least one first processor and further configured to use the location of the first one of the two or more mobile computing devices to determine an appropriate emergency response unit to notify; and a notification module configured to run on the at least one first processor and further configured to notify the appropriate emergency response unit of the first trigger message.

Various embodiments concern a method for emergency messaging to a target group where the target group comprises two or more users. The method can include: receiving from the two or more using information regarding a portable communication device from each of the two or more users; storing in one or more databases a profile for the portable communication devices associated with each of the two or more users; selecting a geographic area for emergency messaging; receiving current location information from at least a first user of the two or more users; processing the current location information to identify one or more affected devices, the one or more affected devices comprise the portable communication devices of the two or more users within a selected geographic area; and transmitting an emergency message to the one or more affected devices to alert users of the one or more affected devices to an emergency in the selected geographic area.

In some embodiments, a method for emergency messaging to a target group based in part on current location information derived from portable communication devices associated with individuals of the target group is provided. The method can include: receiving from the two or more using information regarding a portable communication device from each of the two or more users; storing in one or more databases a profile for the portable communication devices associated with each of the two or more users; selecting a geographic area for emergency messaging; receiving current location information from the portable communication devices, and communicating the current location information to the emergency messaging services system; and evaluating the current location information and opening one-way and/or two-way emergency messaging communication between the emergency messaging services system and the portable communication devices within the selected geographic area.

Various embodiments can concern a system for emergency messaging to a target group based in part on current location information derived from portable communication devices associated with individuals of the target group. The system generally can include: an emergency response computer system having an emergency response module. The emergency response module is configured to evaluate current location information derived from portable communication devices associated with individuals of the target group and open one-way and/or two-way emergency messaging communication between the emergency response computer system and the portable communication devices identified as within a selected geographic area; and one or more databases for storing profiles for a portable communication device associated with each individual of a target group, wherein the one or more databases is in communication with the emergency response module.

Various embodiment concern a method for emergency messaging to a target group. The target group comprises two or more users. The method can include receiving from the two or more users information regarding a portable communication device from each of the two or more users; storing in one or more databases a profile for the portable communication devices associated with each of the two or more users; selecting a first geographic area for emergency messaging; receiving current location information from at least a first user of the two or more users; processing the current location information to identify one or more affected devices, the one or more affect devices comprise the portable communication devices of the two or more users that are within the first geographic area; and transmitting an emergency message to the one or more affected devices to alert users of the one or more affected devices to an emergency in the first geographic area.

In many embodiments, an emergency response module interfaces with a remote computing device that will call a specified emergency responder based on the caller's location. The outgoing call can be customized to connect to the appropriate emergency service. For travelers in foreign countries, the embodiment can give the option to connect with English speaking emergency assistance. In addition, the subscriber can receive immediate notification of the caller's location and contact information to enhance response capability and reporting.

Some embodiments can be considered to be an advisory distribution service which sends information about dangerous weather, crime and political unrest to people in the affected location, and people with plans to travel there, simultaneously reporting to the subscriber on affected members of the community. Sources of advisory information would include, but not be limited to: US State Department, National Weather Service, European Weather, Centers for Disease Control (CDC), Transportation Security Administration (TSA), and third party providers.

Numerous embodiments concern an emergency communications module with a remote computing device that directs communication to the appropriate service providers for travel, medical care, ticket sales, social, and other services. The emergency communications module recognizes different users and connects to the correct provider, allowing different providers for different population segments and/or for calls made from different locations.

The same or different embodiments concern an emergency communications module with a remote computing device that provides directory based text or instant messaging based on a tiered system that controls access and group messaging through assigned tier groups. Messaging is permission-based by tier and has built-in abuse controls that can be customized. The emergency communications module with a remote computing device allows groups built to simplify communication for classes, clubs and committees, while safeguards keep group messaging from becoming a problem. Top down hierarchy allows management tier users to message any individual, group of users, or the entire community, while rank and file users have limited access to group and individual messaging. It will be appreciated that the group messaging is helpful to connect emergency responders with the users that require assistance and to connect emergency responders with each other in coordinating their efforts. Also, as explained in detail below, the group messaging functionality combined with the sharing of user profile information between the user mobile computing device and the emergency response computer system can be particularly beneficial to persons who are deaf, hearing impaired, or speech impaired.

Another aspect of the embodiments relates to an interface with a remote computing device to provide a virtual tour guide on the device that will allow users to take a tour complete with directions, instructions and tour explanations. The interface with a remote computing device will also provide directions to anywhere on subscriber's campus from a user's current location. The interface with a remote computing device can be loaded with user profile information to provide directions to get to classes or meetings.

Another aspect of the disclosure relates to an interface with a remote computing device which places advertising, news or other print and/or video content onto the interface with a remote computing device. Advertising/messaging can be triggered by user location, and the database can record "views" by users.

Turning to the drawings, FIG. 1 illustrates block diagram of an emergency messaging system 100, according to a first embodiment. Emergency messaging system 100 is merely exemplary and is not limited to the embodiments presented herein. Emergency messaging system 100 can be employed in many different embodiments or examples not specifically depicted or described herein.

Emergency messaging system 100 can provide emergency voice and/or messaging services in many different services (e.g., text, email, voice, text to voice, etc.). Generally, emergency response services can be established with a target group of individuals within a selected geographic area. In certain embodiments, emergency messaging system 100 can be provided to a target group based in part on current location information derived from remote computing devices associated with individuals of the target group. The target group may be all individuals physically located within a specific geographic location (e.g., a zip code, a city, a county, a state, a university or college campus, work location, office building, airport, public space, or a region served by a specific emergency response group), all individuals registered to be located at a specific geographic location (e.g., all students, faculty, staff, etc. at a university or college campus; all workers at a work location or office building; all users of a public space, all residents of a region, all people with a cell phone having a particular area code), all individuals purchasing admission to a designated event, etc.

Emergency messaging system 100 can provide one-way and/or two-way communication between users, administrators of emergency messaging system 100, and emergency response units. In certain aspects, emergency messaging system 100 can receive communications of users and record, log, and/or otherwise utilize these communications to manage a potential emergency situation. Emergency trigger messages from users can be received via phone, email, text, text to voice, etc. The message may be received through a specialized application on the user's remote computing device, or can be provided by emergency services to the subscriber administrator. Once an emergency message is received from a user, the message may be populated into databases of emergency messaging system 100, and the message can be analyzed for a potential emergency situation.

By way of non-limiting example, message receipt and processing can occur as follows: a user activates an emergency communication module on a remote computing device and provides a text, voice-based emergency message, and/or email or phone message; an emergency communications module obtains location information for the user and sends message content and location information; an emergency response module receives a "911 call initiated notice message" that can include: unique user ID, user name from profile, user location, time, date, call path, time to process call; the 911 call initiated notice message is transmitted to a system administrator contact; the 911 call initiated notice message is recorded into an event log; the emergency response module notes the message time to a mass event timer for an event time check; the emergency response module populates the message to database(s) for analysis of a potential emergency situation. The emergency message can also be forwarded to the appropriate emergency response unit.

In certain aspects, the emergency response module also tracks and logs the time required to deliver messages, delivery confirmations and interval, as well as delivery system used. The emergency response module also can send a delivery report with this information to the emergency message log, and send it via email to the response unit's email designated for delivery of emergency messages. The emergency response module also can send a copy of the report to the system administrator.

Referring to FIG. 1, in some embodiments, emergency messaging system 100 (i.e., an messaging system) can include: (a) a response computer system 101; (b) two or more remote computing devices 102, 103, and 104; (c) one or more first level response units 105; and (d) one or more second level response units 106. In some examples, response computer system 101, remote computing devices 102, 103, and 104, first level response units 105, and second level response units 106 can be configured to communicate using communications network 108.

In the same or different embodiments, emergency messaging system 100 can include: (a) an emergency response module 150 (i.e., a response module) configured to run on processing unit 161 of emergency response computer system 101; (b) an emergency communications module 110 configured to run on processing unit 121 of remote computing device 102; (c) an emergency communications module 143 configured to run on a processing unit of remote computing device 103; and (d) an emergency communications module 144 configured to run on a processing unit of remote computing device 104.

Emergency response computer system 101 can include: (a) at least one processing unit 161; (b) emergency response module 150 configured to run on processing unit 161; (c) a storage device 162; and (d) an operating system 165 configured to run on processing unit 161. In many embodiments, emergency response module 150 can include: (a) a device communications module 151; (b) a processing module 152; (c) an alert reception module 153; (d) a response module 154; (e) a notification module 155; (f) a determination module 156; (g) an administration module 157; and (h) a user location update module 159.

In some examples, remote computing devices 102, 103, and 104 can be smart devices configured to execute one or more software programs. For example, each of remote computing devices 102, 103, and 104 can be an iPhone® or iPad® device manufactured by Apple Computers, Inc. of Cupertino, Calif., a Blackberry® device, manufactured or licensed by Research in Motion Limited, or a smart device running the Android™ operating system of Google, Inc., and/or a Palm® device manufactured or licensed by Palm, Inc. The software program can run in the foreground as an application, in the background with the operating system, or there can be a partial operating system integration.

Remote computing device 102 can include: (a) at least one processing unit 121; (b) emergency communications module 110 configured to run on processing unit 121; (c) a storage device 122; (d) an operating system 124 configured to run on processing unit 121; and (e) a user control module 123. In various embodiments, emergency communications module 110 can include: (a) an emergency sending module 111; (b) a monitoring system 112; and (c) a location determination module 113. In some examples, emergency communications modules 143 and 144 can be similar or identical to emergency communications module 110. In the same or different embodiment, remote computing devices 103 and 104 can be similar or identical to remote computing device 102.

First level response units 105 can be emergency response unit(s). First level response units 105 can include local police departments, fire departments, ambulance services, and local emergency response teams. For example, on a university campus, first level response units 105 can be the university police department.

Second level response units 106 can be one or more people or groups that are responsible for making decisions regarding distribution of information about an emergency. Second level response units 106 can include local or state government officials, local police or fire chiefs, local and state government disaster agencies, or other officials. For example, on a university campus, second level response units 106 can include the chief of the university police department, the university president, and/or other members of the administration of the university. In some examples, response computer system 101 can store lists of the appropriate first and second level response units for predetermined areas in storage device 162.

Communications network 108 can be a combination of wired and wireless networks. For example, communications network 108 can include the Internet, local wireless or wired computer networks (e.g. a 4G (fourth generation) cellular network), local area network, cellular telephone networks, and the like.

Display 131 of user control module 123 can be configured to display one or more windows, messages, icons, or other objects associated with emergency communications module 110. Display 131 can be an LCD (liquid crystal display), plasma, cathode ray tube, or another type of display.

Input device 132 of user control module 123 can be configured to allow a user to enter information into remote computing device 102 related to emergency communications module 110. For example, input device 132 can include buttons, a keyboard, a touchpad (separate from or integrated into display 131), microphone, mouse, trackball, or other input mechanisms. In some embodiments, display 131 and input device 132 are merged into the same component such as a touch screen.

Location determination module 113 can be configured to run on processing unit 121 and also can be configured to determine the location of remote computing device 102 and to communicate the location information to emergency sending module 111. In one example, remote computing device includes or is coupled to a GPS (global positioning satellite) receiver. Location determination module 113 can receive the location information from the GPS receiver in this example. In some examples, a GPS receiver can receive electrical signals from GPS satellites and use these electrical signals to calculate the location of remote computing device 102.

In the same or other embodiments, other methods can be used to determine the location of remote computing device 102. For example, remote computing device 102 can include a wireless networking device, and signals from and locations of the transmitters, routers, and other communications devices in communications network 108 can be used to calculate the current location of remote computing device 102.

Emergency sending module 111 can be configured to run on processing unit 121 and also can be configured to send an emergency trigger message and the location information to device communications module 151. In some examples, emergency sending module 111 can also receive communications from emergency response computer system 101.

Monitoring module 112 can be configured to run on processing unit 121 and further configured to monitor remote computing device 102 to determine if any telephone calls have been made to an emergency telephone number. In one example, monitoring module 112 can periodically check (e.g., one, five, ten, or thirty minutes) information stored in storage device 122 (e.g., telephone logs) to determine if any telephone calls have been made to an emergency telephone number. In other examples, monitoring module 112 can monitor in real time all outgoing telephone calls to determine if the telephone call is to an emergency number.

In some examples, if monitoring module 112 determines that a telephone call has been made to an emergency number, monitoring module 112 can notify emergency sending module 111 that an emergency call was made and the time of the emergency telephone call. Emergency sending module 111 can notify device communications module 151 of the emergency telephone call. In some examples, the notification of the emergency telephone call can be an emergency trigger message.

Device communications module 151 can be configured to run on processing unit 161 and also can be configured to communicate with remote computing devices 102, 103, and 104 using communications network 108. Device communications module 151 can be configured to receive emergency trigger messages from one or more users via remote computing devices 102, 103, and 104. In some examples, the emergency trigger messages can be text messages, and device communications module 151 can be configured to receive the emergency text messages from remote computing devices 102, 103, and 104. In various embodiments, device communications module 151 can send messages to remote computing devices 102, 103, and 104.

Such a communications interface can be any suitable form of wired or wireless connection including, but not limited to, USB (universal serial bus) connection, serial connection, cellular communication, IEEE 802.11, etc. This communications interface may also be multi-channel in some embodiments. For example, if the communications interface is implemented using cellular communications, device communications module 151 can be able to reroute communications from a cell tower that is, for some reason, unavailable to another functioning cell tower.

Alert reception module 153 can be configured to receive event or alert notifications from one or more third party sources. For example, alert reception module 153 can be configured to receive event or alert notifications from the U.S. Federal Emergency Management Agency (FEMA), the U.S. State Department (State Department), the U.S. Geological Survey (USGS), the U.S. Centers for Disease Control (CDC), the National Oceanic and Atmospheric Administration (NOAA), and the U.S. Food and Drug Administration (FDA). In some examples, alert reception module 153 can communicate the notifications to processing module 152. The notification can be considered an emergency trigger message in some examples.

User location update module 159 can be configured to run on processing unit 161 and can be further configured to perform user location identification updates. In many embodiments, emergency response module 150 can utilize user (i.e., target group individual) current location information to facilitate the response to an emergency. In some embodiments, user location update module 159 can obtain current location information of users and translate the information into a more usable format. For instance, GPS or location coordinate information may be translated into Military Grid Reference System (MGRS), and the GPS, location coordinate information and/or MGRS can be stored in user profiles (along with time/date stamps) in a database of storage device 162.

By way of non-limiting example, user location update module 159 location translation may occur as follows: location determination module 113 initiates GPS determination in remote computing device 102 via emergency communications module 110; emergency communications module 110 transmits GPS location information to device communications module 151; user location update module 159 updates the user profile stored in a database of storage device 162 with GPS location information. User location update module 159 also translates GPS location information into a city and country and populates current city and country into user profile. In some examples, user location update module translates GPS location information into Military Grid Reference System (MGRS) rubric and populates current MGRS location into user profile.

User location update module 159 can determine current location information for users at predefined time intervals (e.g., every 15 minutes, every 30 minutes, every 1 hour, every 2 hours, every 4 hours, every 12 hours, every 24 hours, etc.) or on-demand. For example, a system administrator can update the location information for all users or a subset of users when an emergency occurs. User profiles in storage device 162 can be updated to include current location information on a real-time basis, so as to only include the most current location information, or user profiles may be updated to include a history of location information (e.g., to include the last, e.g., 5, 10, 15, 20, 25, etc., locations, and/or to include 1 day, 2, days, 3 days, 4 days, 5 days, 1 week, 2 weeks, 3 weeks, 4 weeks, 1 month, 2 months, 3 months, 4 months, 5 months, 6 months, etc., worth of location information).

In some examples, user location update module 159 can update user locations on-demand as follows: a system administrator of emergency response computer system 101 logs into the emergency response computer system and opens user location update module 159; user location update module 159 includes a "Select User" function; and the system administrator selects the users from a recipient rules list for GPS update, which forces a GPS update to all selected EMS users.

Processing module 152 can be configured to run on processing unit 161 and also can be configured to process one or more emergency trigger messages to determine an emergency level. In some examples, processing module can include: (a) a location module 164; and (b) an analyzing module 163.

Location module 164 can be configured to run on processing unit 161 and also can be configured to determine a location of remote computing devices 102, 103, and 104. In some examples, location module 164 can instruct device communications module 151 to have remote computing device 102, 103, and 104 send their current locations to emergency response module 150. In the same or different examples, location module 164 can retrieve the locations of one or more of remote computing devices 102, 103, and 104 from a database in storage device 162. After location module 164 determines the locations of one or more of computing devices 102, 103, and 104, location module 164 can store the received locations in a database of storage device 162.

Analyzing module 163 can be configured to run on processing unit 161 and also can be configured to analyze the emergency trigger messages to determine a content of the emergency trigger messages. In some examples, analyzing module 163 is configured to analyze two or more emergency trigger messages to determine if the emergency trigger messages contain one or more predetermined trigger words. The predetermined trigger words can be word or phrases that indicate that a high-risk emergency is occurring or has occurred. For example, the predetermined trigger words can include homicide, murder, slaughter, rape, assault, arson, fire, weapon, gun, shoot, shooting, rifle, pistol, kill, handgun, bomb, explosion, gas, flood, earthquake, rob, steal, burglar, burglary, stolen car, stole car, stole my car, drug, cocaine, marijuana, and/or heroin.

In other examples, the emergency trigger message can be a sound recording. For example, the emergency trigger message can be a recording of a telephone call to an emergency response number (e.g., a 911 call). In this example, analyzing module 163 can automatically transcribe the telephone call into text and determine if the telephone call included any of the predetermined trigger words.

Response module 154 can be configured to run on processing unit 161 and also can be configured to determine a level of response to the two or more emergency trigger messages based upon the location of remote computing devices sending the emergency trigger messages and the content of the emergency trigger messages.

In some examples, response module 154 can determine the appropriate potential level of response to the emergency trigger messages based at least partially upon the frequency and content of the emergency trigger messages and location of the sending of the emergency trigger messages. In one example, the levels of response include a first (lower) level response and a second (higher) level response. After response module 154 determines the level of response, the level of response and the underlying information is communicated to determination module 156.

Determination module 156 is configured to run on processing unit 161 and also can be configured to use the location of the two or more emergency trigger messages to communicate with notification module 155 and determine which (if any) of first level response units 105 and second level response units 106 to notify.

Notification module 155 can be configured to run on processing unit 161 and also can be configured to notify the appropriate first response units and second level response units of the emergency.

Analyzing module 163 in combination with response module 154, determination module 156, and notification module 155 can analyze the incoming emergency trigger messages to determine if a triggering mass event has occurred based on content, volume, and/or timing of emergency communication and respond appropriately. By way of non-limiting example, analyzing module 163 in combination with response module 154 and determination module 156 analyzes content, time and frequency of message events, including 911 calls and emergency trigger messages from users; in the event the number of message events meets a predefined trigger threshold within a number of minutes specified, a mass event warning is initiated; notification module 155 creates a mass event warning message, including, e.g., information from the messages that triggered the mass warning event: user name, ID, location, message or call time, type of message (911 call or emergency response messaging system message), and, for example, message content: "[Subscriber Name] MASS EVENT WARNING HAS BEEN TRIGGERED BY RECEIPT OF [Number of Message Events from Mass Event Schedule] SUBMITTED TO THE SYSTEM IN [Mass Event Time From Mass Event Schedule] OR FEWER MINUTES. TRIGGER MESSAGES ARE ATTACHED TO THIS COMMUNICATION. RECOMMEND YOU BEGIN MONITORING THE INGRESS EMERGENCY MESSAGE PORTAL AVAILABLE AT [URL for Subscriber EMS Portal]."

Notification module 155 can enter mass event warning message into a subscriber's message log in a database of storage device 162 and transmits subscriber emails designated for receipt of emergency messages. Notification module 155 can capture data for report generation to first level response units 105 and/or second level response units 106. Response module 154 can send a request to user location update module 159 to initiate an all users (or a subset of users) update location request.

In the same or different embodiment, the analyzing module 163 can analyze messages for potential mass events based on content, e.g., particular trigger words in received emergency messages. Likewise, analyzing module 163 be configured to determine if an emergency event is occurring that requires reporting based on reporting requirements of The Jeanne Clery Disclosure of Campus Security Policy and Campus Crime Statistics Act. By way of non-limiting example, analyzing module 163 can analyze messages as follows: analyzing module 163 analyzes incoming emergency messages for trigger words that suggest a Clery reporting requirement incident may have occurred; in the event that the word(s) from the Clery event trigger list are found in an incoming emergency trigger message, a Clery Event message can be initiated by notification module 155; notification module 155 can create a Clery Event message that includes, e.g., information from the messages that triggered the message including: user name, ID, location, message or call time, and message content, for example: "[Subscriber Name] CLERY EVENT WARNING HAS BEEN TRIGGERED BY RECEIPT OF AN EMERGENCY MESSAGE SUBMITTED TO THE SYSTEM THAT INCLUDES THE WORDS [trigger words from message]. TRIGGER MESSAGE IS ATTACHED TO THIS COMMUNICATION. MESSAGE HAS ALSO BEEN SENT TO CLERY MESSAGE EMAIL ADDRESS [Subscriber Clery email Address]"; Clery Event Warning Message is entered into subscriber Clery message log in a database in storage device 162 and transmitted to second level response units designated for receipt of Clery messages; and data is captured for report generation.

Administration module 157 can be configured to run on processing unit 161 and further configured to be used by a system administrator to administer and control emergency response module 150. For example, a system administrator using administration module 157 can create a user introduction/set-up to provide an instructional "welcome" message to provide to users of remote computing devices 102, 103, and 104, providing details to a new user of what emergency messaging system 100 does and when it should be used. Messages may have a default text, or may be edited by the system administrator. In certain embodiments, the welcome message may be sent to all users/individuals of a target group upon joining of the group (e.g., orientation at a university, workplace, etc.).

Furthermore, system administrator using administration module 157 can perform general set-up and configuration functions. By way of non-limiting example, a system administrator can create a user introduction/set-up using administration module 157 as follows: a system administrator logs onto administration module 157 and enters configuration page; the system administrator enters page for entry of system user advice; the system administrator edits/writes user message detailing use of system interface; the system administrator hits "Save Changes" to enter new message into the administration module 157; administration module 157 saves change to change log with a copy of the previous message, a copy of the new message, user information for the system administrator making the change, date, and time; users of remote computing devices 102, 103, and/or 104 receive a system use notice upon initial interface with emergency messaging system service as push message and optional redundant email. An exemplary message may read as follows:

[Subscriber Name] EMERGENCY MESSAGE SYSTEM:

[Subscriber Name] has subscribed to the emergency messaging system. Through the use of the Emergency Message button on the [Subscriber Name] App, you can send a message to law enforcement and [Subscriber Name] in the event of an emergency, to request assistance or to report a crime. The emergency messaging system will provide your information to law enforcement to expedite a response. Use the emergency messaging system as you would calling 911 from a regular phone.

Administration module 157 can also be configured to provide the system administrator the ability to designate mass event trigger words. By way of non-limiting example, a system administrator can create mass event trigger words as follows: a system administrator logs into administration module 157 and enters configuration page; the system administrator enters page for entry of system mass event trigger list; the system administrator edits/writes Trigger List as desired; the system administrator hits "Save Changes" button when complete; the administration module 157 saves change to change log with a copy of the previous mass event trigger list, a copy of the new mass event trigger list, user information for the system administrator making the change, date, and time.

Administration module 157 can be further configured to also provide the system administrator the ability to designate Clery event trigger words. By way of non-limiting example, a system administrator may create Clery event trigger words as follows: the system administrator logs onto administration module 157 and enters configuration page; the system administrator enters page for entry of emergency system Clery event trigger list that is stored in a database of storage device 162; the system administrator edits/writes Clery event trigger list; the system administrator hits "Save Changes" button when complete; administration module 157 saves change to change log with a copy of the previous Clery event trigger list, a copy of the new Clery event trigger list, user information for the system administrator making the change, date, and time.

As described herein, the systems and methods may provide emergency messaging services in many suitable messaging services (e.g., text, email, voice, text to voice, etc.). Administration module 157 can also be configured to provide the ability to the system administrator to review and order method(s) of message delivery. By way of non-limiting example, a system administrator may review and order message delivery as follows: the system administrator logs onto administration module 157 and enters configuration page; the system administrator enters page for entry of cascade options, including, e.g., push, SMS, email, text to voice, etc.; the system administrator may select numbered boxes to indicate order of preference for attempt, lowest to highest with default order, e.g., 1) push, 2) SMS, 3) email, 4) text to voice, etc., with an editable time interval for attempt of next transmission option with default, e.g., of 60 seconds; the system administrator may also check box to indicate "always send" with default as email; administration module 157 saves change to change log with a copy of the previous selections, a copy of the new selections, user information for the EMS system administrator making the change, date, and time. During an emergency, emergency response module 150 can track send time and receipt of delivery confirmation and cascade if delivery interval is exceeded.

In additional aspects, administration module 157 can be configured to allow a system administrator to establish various scheduling, calendaring and reporting features. For instance, a schedule for establishing a system administrator for notification of potential emergency situations can be established, as well as a schedule for automatic generation of reports (e.g., reports of potential Clery events, potential mass events, routine logs of emergency messages, repeat users of the IEMS system, etc.). In addition, administration module 157 can be configured to allow a system administrator to set predefined thresholds for various system functionalities, e.g., mass event trigger limits such as number of messages within a set time, etc., and may designate an administrator to monitor and adjust as needed (e.g., based on scheduled upcoming events). Such scheduling functions may be compatible with calendaring programs such as Microsoft® Outlook, Google® Calendar, Lotus Notes® Calendar, etc.

Mapping module 158 can be configured to run on processor unit 161 and further configured to allow a system administrator, a first level response unit 105, and/or second level response units 106 to access maps of specific geographic regions and/or structures in these geographic areas. By way of non-limiting example, mapping module 158 includes or is in communication with a display apparatus that comprises a touch screen, for example. Selected areas of the target geographic area (e.g., selected buildings, floors, parks, zones, etc.) may be "selected" by touching those areas via the touch screen. Mapping module 158 can load maps of all areas within the target geographic area that have been selected. In various embodiments, the graphical display may include zoom and toggle functions to aid in selection. Zoom features will generally maintain the same grid system, recalibrating the grid GPS integrated coordinates to maintain accuracy. In certain embodiments, clicking/selecting the graphical representation and moving the selection will move the view field.

To facilitate selection of the geographical area of interest, in certain embodiments, mapping module 158 can provide for the integration of location names into the graphical representation of the target geographical area via a website or other suitable graphical user interface may be used. By way of non-limiting example, mapping module 158 provides for integration location names as follows: graphical representations of a target geographical area (e.g., graphical maps) are uploaded into database(s) of storage device 162 and published for display to a display apparatus graphical user interface; the system administrator is prompted to give the map a name (e.g. Main Campus), which is saved and populated to a database of storage device 162; mapping module 158 creates an alphanumeric grid over the graphical representation, and loads geospatial location of target geographical area; mapping module 158 translates grid coordinates to GPS coordinates and associates GPS coordinates within the grid box; mapping module 158 can have a "Load Previous Map" function that may load previous builds of the same target geographical area into current working map, e.g., for comparison; mapping module 158 can automatically identify map features that appear to be structures (e.g., based on feature recognition algorithms); the system administrator can identify a structure or feature of the map in several ways, including by clicking on the map to select a discrete feature, using a draw dialogue, or a drag and select dialogue, each of which opens a dialogue box for labeling the structure or feature; once the system administrator identifies a structure or feature and provides a name, mapping module 158 populates the name to a list of locations associated with that map; mapping module 158 calculates a coordinate range for the space inside the map building/feature and associates that coordinate range with that map building/feature (within a predefined coordinate tolerance range).

In other embodiments, mapping module 158 can be configured to facilitate a manual pin drop location creation mechanism that may be used to create ad hoc geographic area selection zones. By way of non-limiting example, if no location names or other groupings adequately define a desired geographic area messaging, pin drop location creation may be performed as follows: an subscriber administer may press a "Pin Drop" button on the graphical interface of mapping module 158, which will initiate a user interface to allow the subscriber administer to drop "pins" in the geographic area to define a selected area; once three or more pins are dropped and the button is pushed to stop dropping pins, mapping module 158 will initiate a dialogue box, prompting for a location name; once entered, the location name will populate to the locations list; "mousing" or selecting over a pin for the completed pin location will display the location name and give an option to delete the location.

"Response computer system 101," as used herein, can refer to a single computer, single server, or a cluster or collection of servers. Typically, a cluster or collection of servers can be used when the demands for processing are beyond the reasonable capability of a single server or computer. In many embodiments, the servers in the cluster or collection of servers are interchangeable from the perspective of remote computing device 102, 103, and 104.

In some examples, a single server can include device communications module 151, processing module 152, alert reception module 153, response module 154, notification module 155, determination module 156, administration module 157, mapping module 158, and user location update module 159. In other examples, a first server can include a first portion of these modules, and one or more second servers can include a second, possibly overlapping, portion of these modules. In these examples, emergency messaging system 100 can comprise the combination of the first server and the one or more second servers.

In some examples, storage device 162 can include one or more databases (e.g., indexes) to store information about incoming emergency trigger messages. All of these databases can be a structured collection of records or data, for instance, which is stored in storage device 162. For example, the databases stored in storage device 162 can be an XML (Extensible Markup Language) database, MySQL, or an Oracle® database. In the same or different embodiments, the indexes could consist of a searchable group of individual data files stored in storage device 162.

In many embodiments, a profile for each portable communication device associated with each user can be stored in one or more databases of storage device 162. The profile may include information of the individual associated with the portable communication device, such as name, age, residence, email address, phone number, emergency contact information, current location of the user, past locations of the user, links to school/health/employment/etc.

In various embodiments, operating systems 124 and 165 can be software programs that manage the hardware and software resources of a computer, remote computing device, and/or a computer network. Operating systems 124 and 165 can perform basic tasks such as, for example, controlling and allocating memory, prioritizing the processing of instructions, controlling input and output devices, facilitating networking, and managing files. Examples of common operating systems for a computer include Microsoft® Windows, Mac® operating system (OS), UNIX® OS, and Linux® OS. Common operating systems for a mobile device include the iPhone® and iPad® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows® Phone operating system by Microsoft Corp. of Redmond, Wash., or a Symbian operating system by Nokia Corp. of Espoo, Finland.

As used herein, "processing unit" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

Figure 2:
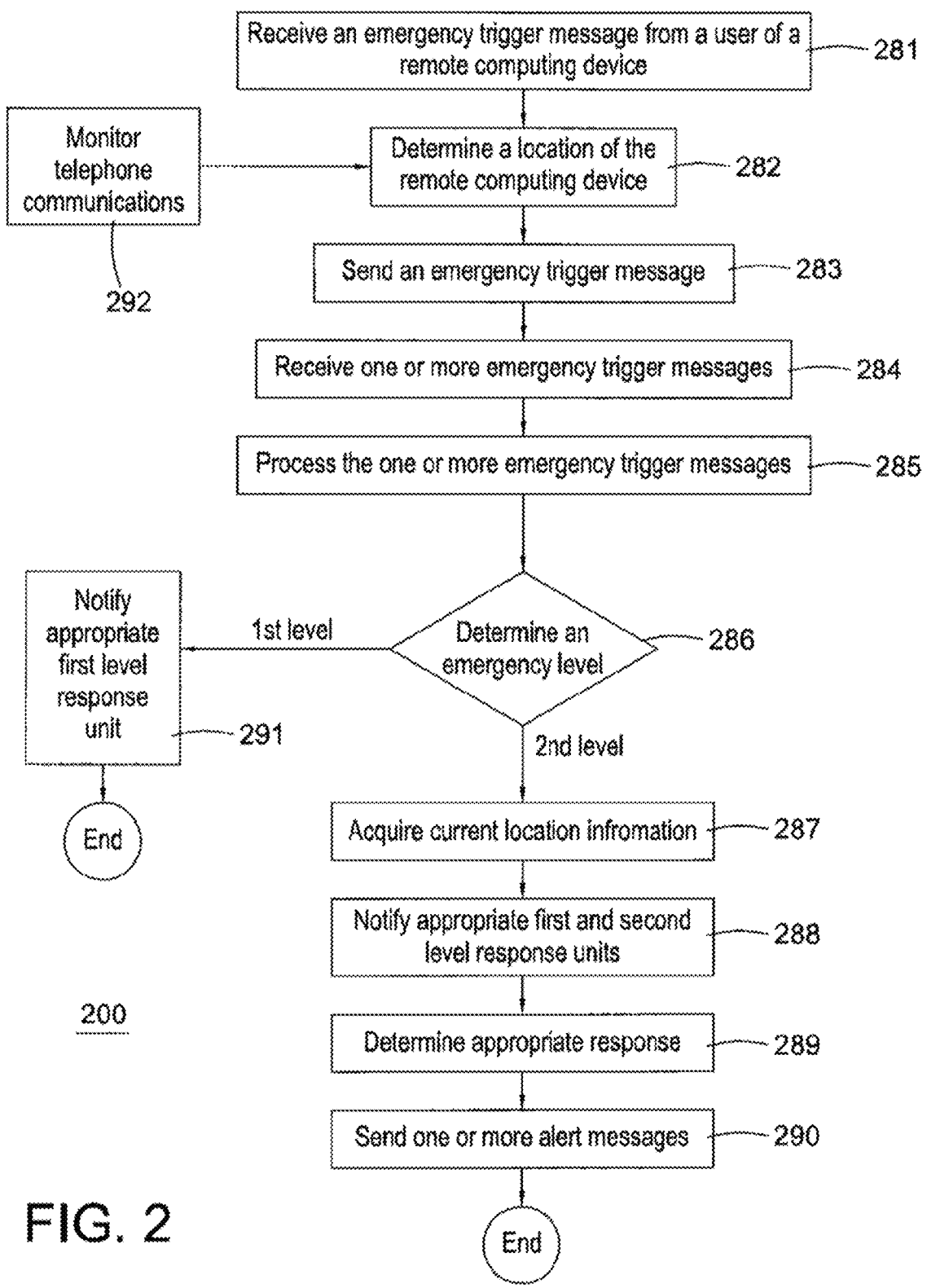
FIG. 2 illustrates a flow chart for an embodiment of a method of responding to an emergency, according to the first embodiment.

FIG. 2 illustrates a flow chart for an embodiment of a method 200 of responding to an emergency, according to a first embodiment. Method 200 is merely exemplary and is not limited to the embodiments presented herein. Method 200 can be employed in many different embodiments or examples not specifically depicted or described herein. In some embodiments, the activities, the procedures, and/or the processes of method 200 can be performed in the order presented. In other embodiments, the activities, the procedures, and/or the processes of method 200 can be performed in any other suitable order. In still other embodiments, one or more of the activities, the procedures, and/or the processes in method 200 can be combined or skipped.

As described herein, referring back to FIG. 1, the systems of methods of the disclosure may include one-way and/or two-way communication between users and system administrators, first level response units 105, and/or second level response units 106. In some embodiments, emergency response module 150 can receive communications of users and record, log, and/or otherwise utilize these communications to manage a potential emergency situation. Emergency trigger messages may be received via phone, email, text, text to voice, etc. The emergency trigger message can be received through emergency communications module 110 running on processing unit 121 of the user's remote computing device, or can be provided by emergency services to the subscriber administrator. Once an emergency message is received from a user, the message may be populated in databases of storage device 162, and the message may be analyzed for a potential emergency situation.

Returning to FIG. 2, method 200 includes an activity 281 of receiving an emergency trigger message from a user of a remote computing device. In some embodiments, the emergency trigger message is received from a user of the remote computing device using an emergency sending module of an emergency communications module. The emergency communications module and emergency sending module can be running on a processor of the remote computing device.

Referring back to FIG. 1, for example, a user can activate emergency communications module 110 on remote computing device 102, and emergency sending module 111 can be opened. Emergency sending module 111 can present a user of remote computing device 102 a window on display 131 into which the user can type the emergency trigger message using input device 132. In some examples, the emergency trigger message is a text message, and the user can type the text message into the window of emergency sending module 111. In other examples, the emergency trigger message can be a sound recording, and the user can record the emergency trigger message using input device 132.

Referring again to FIG. 2, method 200 in FIG. 2 continues with an activity 282 of determining a location of the remote computing device. In some examples, a location determination module of the emergency communications module can determine the location of the remote computing device.

Referring to FIG. 1, for example, after the user submits the emergency trigger message, emergency sending module 111 can request the current location of remote computing device 102 from location determination module 113. In other examples, emergency sending module 111 can request the current location of remote computing device from location determination module 113 when the user activates emergency communications module 110 or when the user begins entering the emergency trigger message into remote computing device 102. After location determination module 113 determines the location, location determination module 113 can communicate the location to emergency sending module 111.

Referring back to FIG. 2, method 200 includes an activity 283 of sending the emergency trigger message to the response computer system. In some examples, sending the emergency trigger message can include sending an audio recording or text message with one or more trigger words to the response computer system using the emergency module. In other examples, sending the emergency trigger message can include a telephone call to a human operator in communication with response computer system 101.

Although emergency calls to emergency dispatchers (also known as 911 operators) may not pose any particular hurdle for most people, phone calls can be a challenge for people who are deaf, hearing impaired, or speech impaired. Tools have been developed to enable emergency calling for hearing and speech impaired persons, such as teletypewriters (TTY) and video relay services. TTY is a transcription service that translates speech into text, but this service is limited to land lines. Video relay requires a broadband connection that doesn't work reliably on mobile phones. Therefore, TTY and video relay are mostly limited to the home and office environments but are unavailable for making emergency calls whenever the person is away from home and work. For the most part, individuals with these disabilities are currently unable to make emergency calls from mobile phones. As indicated above, the present invention allows for group messaging between the user's mobile computing device and the emergency response computer system, and the users profile information can also be shared so that a dispatch operator will be notified when a hearing or speech impaired person is requesting emergency assistance. No prior PSAP or other emergency response computer system had incorporated a group messaging feature into the communication protocols for the system.

An end user initiates a "call" for emergency services (Emergency Communication Event) by initiating a mobile call, text, pushing a panic button, or other trigger event that has a location associated with it. For events initiated he system pulls the location from the mobile device and associates it with the emergency communication event. The system associates the "caller's" (user managed) emergency information profile with the emergency communication event. The location and profile are automatically distributed with the emergency communication event to all individuals/entities in an emergency response work-flow defined by the community based on services available for the location from which the emergency communication event originates (determined by the mobile device location) based on proximity, status, hierarchy, event type, etc. The system automatically places the "caller" and each of the individuals/entities in the emergency response work-flow into a group messaging in which each of the participating individuals can see shared text based communications from each of the other individuals. As explained above, these features of the present invention are beneficial to anyone who is in need of emergency assistance and is also beneficial to the coordination of emergency responders, but the combination of features are particularly beneficial to the hearing and speech impaired community because they can use their mobile computing devices to communicate an emergency request and can dialogue with the emergency dispatcher and the emergency responders when they are away from their homes and workplaces.

Referring to FIG. 1, for example, after the user submits the emergency trigger message and emergency sending module 111 receives the current location information from location determination module 113, emergency sending module 111 sends the emergency trigger message and the current location information to device communications module 151 over communications network 108. In other examples, if emergency sending module 111 does not receive (or location determination module cannot determine) the current location information within a predetermined period of time (e.g., 1, 5, 10, or 30 seconds), emergency sending module 111 can send the emergency trigger message to device communications module 151 without the current location information.

Next, method 200 of FIG. 2 includes an activity 284 of receiving two or more emergency trigger messages from two or more remote computing devices. In some examples, a response computer system can receive emergency trigger messages from two or more users via two or more remote computing devices. In other examples, activity 284 includes receiving only one emergency trigger message, and activities 284-292 can be performed with only one emergency trigger message.

In some examples, receiving the two or more emergency trigger messages can include receiving one or more text messages from users of the remote computing devices. In various embodiments, receiving the two or more emergency trigger messages further can include receiving an audio recording. The audio recording can be a recording made by a user of a remote computing device or audio recorded from an emergency call to an emergency system (e.g., a recording of a 911 call). In these examples, a device communications module can convert the audio recording into text.

In the same or different examples, at least one of the trigger messages can be an alert message from a third party source. For example, at least one of the emergency trigger messages can be an event or alert notifications from FEMA, the State Department, USGS, CDC, NOAA, and/or FDA.

Figure 3:
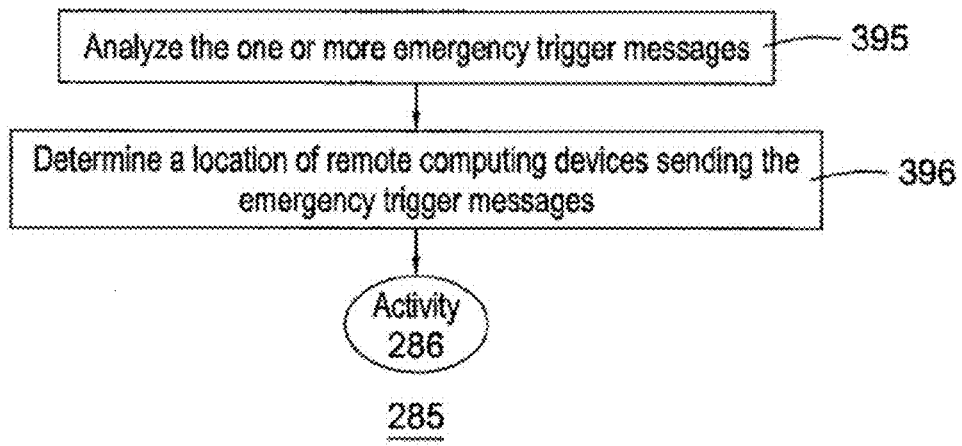
FIG. 3 illustrates a flow chart for an exemplary embodiment of an activity of processing two or more emergency trigger messages, according to the first embodiment.

Method 200 in FIG. 2 continues with an activity 285 of processing the two or more emergency trigger messages. FIG. 3 illustrates a flow chart for an exemplary embodiment of activity 285 of processing the emergency trigger messages, according to the first embodiment.

Referring to FIG. 3, activity 285 includes a procedure 395 of analyzing the two or more emergency trigger messages. In some examples, as shown in FIG. 1, analyzing module 163 can determine a content of the two or more emergency trigger messages. For example, analyzing module 163 can analyze the two or more emergency trigger messages to determine if the two or more emergency trigger messages contain one or more predetermined trigger words. The predetermined trigger words can be word or phrases that indicate that a high-risk emergency is occurring or has occurred.

Referring back to FIG. 3, activity 285 in FIG. 3 continues with a procedure 396 of determining an origination location of at least part of the two or more emergency trigger messages. In some examples, the location information was sent to the response computer system as part of the emergency trigger message. In other examples, the location information was not provided as part of the emergency trigger information. In these examples, referring to FIG. 1, location module 164 can contact the remote computing device that sent the emergency trigger message (e.g., remote computing device 102, 103, or 104) via device communications module 151 and communications network 108. In other examples, location module 164 can query storage device 162 to determine the current or last known location of the remote computing device that sent the emergency trigger message. In these other examples, remote computing devices 102, 103, and 104 can periodically communicate their locations to emergency response module 150, which can store their locations in storage device 162.

If the emergency trigger message includes one or more of the predetermined trigger words, analyzing module 163 can communicate the emergency trigger message along with the location of the remote computing device, if known, to response module 154. After procedure 396 of FIG. 3, activity 285 is complete.

Referring again to FIG. 2, method 200 of FIG. 2 can subsequently include an activity 286 of determining an emergency level. In some examples, the emergency levels can include the first (i.e., lower) level of response or a second (i.e., higher) level of response. In some examples, the level of response to the emergency trigger messages can be determined based upon the location of the senders of the two or more emergency trigger messages and the content of the two or more emergency trigger messages from the senders.

In some examples, determining the level of response can include determining if a predetermined number of the two or more emergency trigger messages include one or more of the predetermined trigger words. In these embodiments, if the predetermined number of messages include the trigger words, the emergency level is the second level of response; otherwise, the emergency level is the first level of response.

In the same or different examples, determining the level of response can include determining if a predetermined number of the two or more emergency trigger messages included one or more of the predetermined trigger words and if the emergency trigger messages including the predetermined trigger words were sent from locations within a predetermined distance of each other. In these embodiments, if these conditions are met, the emergency level is the second level of response; otherwise, the emergency level is the first level of response.

In the same or different embodiment, if the emergency trigger message is an event or alert notifications from a third party source, the emergency level is the second level of response regardless of the content of the message or if any other emergency trigger messages were received.

Referring again to FIG. 1, in some embodiments, response module 154 can determine if a predetermined number of emergency trigger messages have been received with one or more of the trigger words within a predetermined time and have been sent from locations within a predetermined distance of each other.

For example, if response computer system 101 received ten trigger alert messages including the trigger word "gun" and if all ten messages were sent within 500 meters of each other, response module 154 can assign a second level of response. In another example, if eight trigger messages include the trigger word "fire" and if all eight messages were sent from inside the same building, response module 154 can assign a second level of response. In still another example, if a trigger message was received from the U.S. State Department and warned U.S. citizens about traveling to a specific country or region, response module 154 can assign a second level of response. In a further example, if a trigger message from NOAA with a tornado warning for a predetermined geographic area, response module 154 can assign a second level of response.

On the other hand, if one emergency trigger message is received stating that a purse theft occurred in a specific building, response module 154 can assign the lower first level response to the emergency. In another example, if an emergency message is received with none of the trigger words, response module 154 can assign the lower first level response to the emergency.

Figure 4:
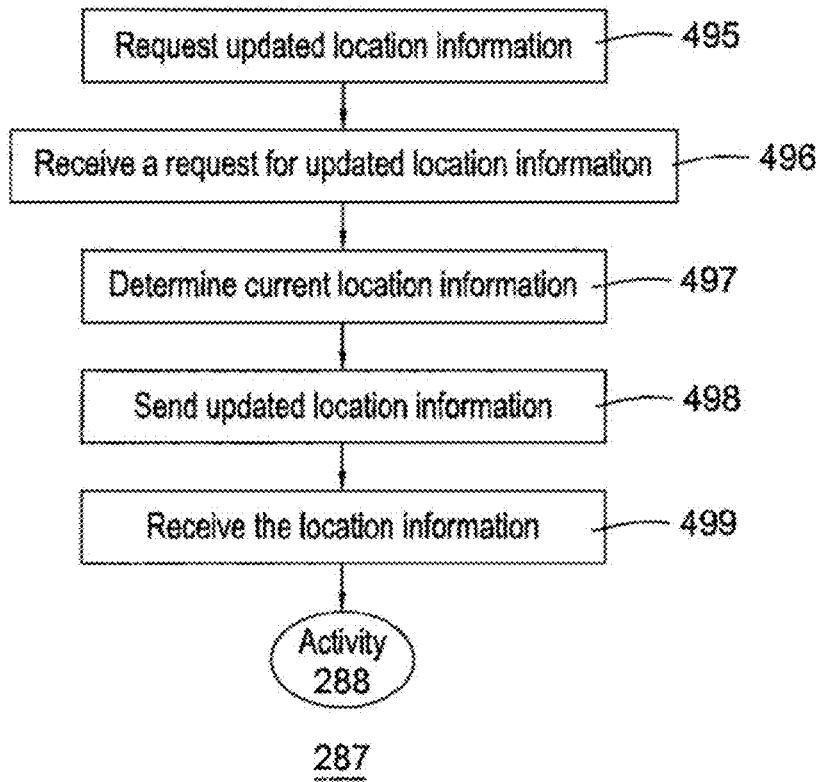
FIG. 4 illustrates a flow chart for an exemplary embodiment of an activity of acquiring current location information, according to the first embodiment.

Referring back to FIG. 2, if the emergency level is a second level of response, method 200 in FIG. 2 continues with an activity 287 of acquiring current location information. In some examples, current location information can be requested from every remote computing device that is part of emergency messaging system 100. In other examples, current location information can be requested from a portion of the remote computing devices that are part of emergency messaging system 100. FIG. 4 illustrates a flow chart for an exemplary embodiment of activity 287 of acquiring current location information, according to the first embodiment.

Referring to FIG. 4, activity 287 includes a procedure 495 of requesting updated location information. In some examples, referring to FIG. 1, location module 164 can communicate to remote computing device 102, 103, or 104 via device communications module 151 and can request updated location information from each of remote computing device 102, 103, or 104.

Referring again to FIG. 4, activity 287 in FIG. 4 continues with a procedure 496 of receiving a request for updated location information. In some examples, emergency communications module 110, 143, and 144 (FIG. 1) of remote computing devices 102, 103, 104 (FIG. 1), respectively, can receive the request for the updated location information from device communications module 151 (FIG. 1) via communications network 108 (FIG. 1).

Subsequently, activity 287 of FIG. 4 includes a procedure 497 of determining current location information. In some examples, procedure 497 can be similar to or the same as activity 282 of FIG. 2.

Next, activity 287 of FIG. 4 includes a procedure 498 of sending updated location information. In some examples, emergency communications modules 110, 143, and 144 (FIG. 1) of remote computing devices 102, 103, 104 (FIG. 1), respectively, can send the updated location information to device communications module 151 (FIG. 1) via communications network 108 (FIG. 1).

Activity 287 in FIG. 4 continues with a procedure 499 of receiving the location information from at least a portion of the two or more computing devices. In some examples, referring to FIG. 1, device communications module 151 can receive the location information from at least a portion of remote computing devices 102, 103, and 104. Device communications module 151 can communicate the location information to location module 164, which can store the location information in storage device 162.

In many examples, device communications module 151 does not receive current location information from all of remote computing devices 102, 103, and 104. One or more of remote computing devices 102, 103, and 104 may not provide location information because, for example, the remote computing device is turned off, the remote computing device does not include a GPS or other location determination sub-system, or the user of the remote computing device has disabled the location determination sub-system. After procedure 499, activity 287 is complete.

Figure 5:
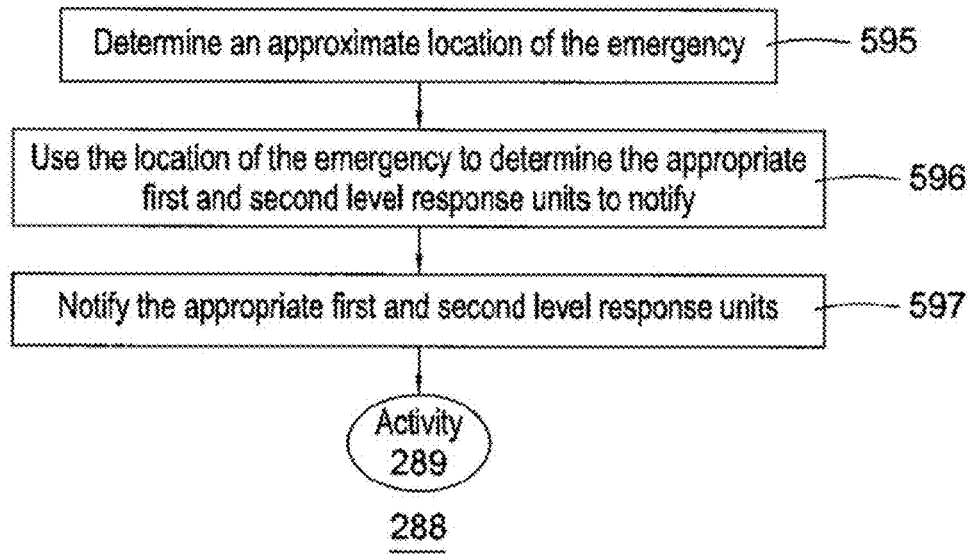
FIG. 5 illustrates a flow chart for an exemplary embodiment of an activity of notifying first and second level response units, according to the first embodiment.

Referring back to FIG. 2, method 200 includes an activity 288 of notifying appropriate first and second level response units. In some examples, referring to FIG. 1, response module 154 can instruct device communications module 151 to notify first level response units 105 and second level response units 106 of the emergency. FIG. 5 illustrates a flow chart for an exemplary embodiment of activity 288 of notifying first and second level response units, according to the first embodiment.

In some examples, the emergency response computer system can be integrated with or in communications with external emergency or security systems (e.g., security cameras, fire alarms, emergency lighting). Accordingly, in addition to notifying the first and second level response units, response module 154 (FIG. 1) can communicate the emergency level or other information with these external systems to, e.g., activate the external systems that are near the location of the emergency. In one example, response module 154 (FIG. 1) can communicate to a security monitoring systems in the region around the emergency and these security monitoring systems can provide the video feeds from video cameras in the area to the emergency response computer system. In some embodiments, emergency response computer system 101 (FIG. 1) can control the video cameras. The images or videos from these video cameras can be attached to or embedded in the notifications that are communicated to the first and second level response units.

Referring to FIG. 5, activity 288 includes a procedure 595 of determining an approximate location of the emergency. In some examples, response module 154 (FIG. 1) can use the location information provided along with the emergency trigger messages to determine the location of the emergency.

Activity 288 in FIG. 5 continues with a procedure 596 of using the location of the emergency to determine the appropriate first and second level response units to notify. In some examples, information can be stored in storage device 162 that identifies the appropriate first and second level response units to notify if an emergency occurs at a specific location. In this example, response module 154 (FIG. 1) can access the information storage device 162 (FIG. 1) to determine the appropriate first and second level response units to notify of the emergency.

Subsequently, activity 288 of FIG. 5 includes a procedure 597 of notifying the appropriate first and second level response units. For example, referring to FIG. 1, response module 154 can communicate to device communications module 151 which first and second level response units to notify. Device communications module 151 can notify the appropriate first and second level response units via communications network 108. After procedure 597, activity 288 is complete.

Figure 6:
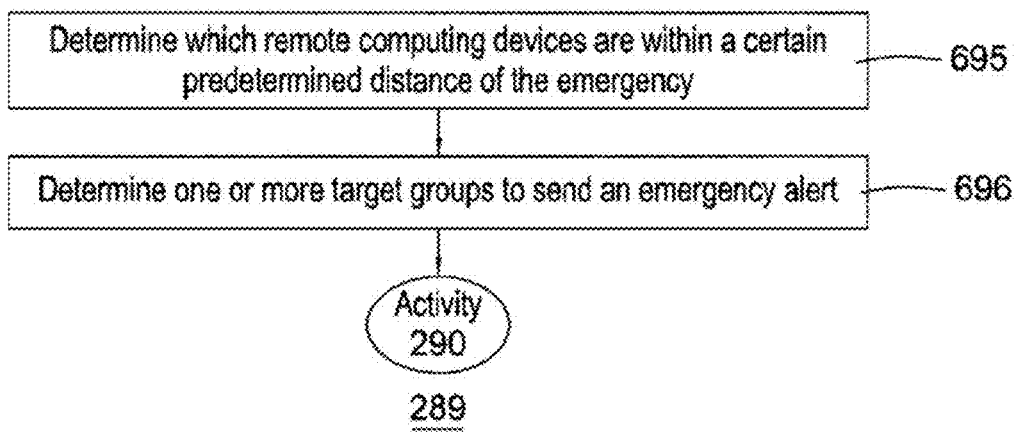
FIG. 6 illustrates a flow chart for an exemplary embodiment of an activity of determining the appropriate response, according to the first embodiment.

Referring again to FIG. 2, method 200 of FIG. 2 further includes an activity 289 of determining the appropriate response to the emergency. FIG. 6 illustrates a flow chart for an exemplary embodiment of activity 289 of determining the appropriate response to the emergency, according to the first embodiment Referring to FIG. 6, activity 289 includes a procedure 695 of determining which remote computing devices are within a certain predetermined distance of the emergency. For example, referring to FIG. 1, determination module 156 can use the location information of at least a portion of remote computing device 102, 103, and 104 that is stored in storage device 162 to determine which remote computing devices 102, 103, and 104 are within a certain predetermined distance of the emergency.

In one embodiment, mapping module 158 can be used to provide a graphical display of a target geographic area. Using mapping module 158, the system administrator (or first or second level response units 105 and 106) can select a geographic area of interest (i.e., as shown in FIGS. 8-14, by way of example, a subset of the target geographic area—a selection of buildings of a university campus, designated quadrants/regions of a target geographic area, a select number of floors of an office building, etc.) from the graphical display of the target geographic area.

Activity 289 further includes a procedure 696 of determining one or more target groups to send an emergency alert. In some examples, the second level response unit determines: (1) if one or more emergency alerts should be sent; and (2) to whom to send the emergency alerts. In some examples, the second level response unit can decide to send the emergency alert to all of the users of the emergency messaging system or a sub-group of all of the users of the emergency messaging system.

For example, the second level response unit can determine to send a first emergency alert message to a first portion of the two or more remote computing devices that are within a first predetermined distance of the emergency and send a second emergency alert message to a second portion of the two or more remote computing devices that are within a second predetermined distance of the emergency. The second level response unit can input into the determination module instructions regarding which target groups to send an emergency alert. The determination module can communicate this information to the notification module.

In certain aspects, notification module 155 (and/or device communications module 151) can provide graphical interface messaging. In certain embodiments, a system administrator can use notification module 155 to send emergency messages to individuals of a target group within a specified geographic area by selecting a geographic area of interest from a graphical representation of a target geographic area.

For example, notification module 155 can send an emergency message to individuals of a target group located within the selected geographic area of interest. By way of non-limiting example, the graphical interface messaging using notification module 155 can occur as follows: the system administrator logs into emergency response computer system 101, and mapping module 158 provides a graphical representation of a target geographic area; the system administrator selects a geographic area of interest from the graphical representation, and the selection is loaded into the mapping module 158; the system administrator selects an option for "Draft Message" or "Load Message" from notification module 155, which initiates a "Outgoing Message" dialogue box; "Draft Message" can provide a pop-up dialogue box to allow drafting of text of a desired message, while "Load Message" may provide a pop-up dialogue box with previously saved messages and pre-drafted messages. The system administrator may select an option for "Add User," "Exclude User" from the "Outgoing Message" dialogue, which initiates recipient rule dialogue boxes.

In some examples, the message can also be sent to: user emails obtained from user profiles in storage device 162, subscriber emails designated for receipt of emergency messages, an emergency message log, and/or may be populated to an Emergency Message Dialogue display on the graphical interface of the mapping module.

Figure 9:
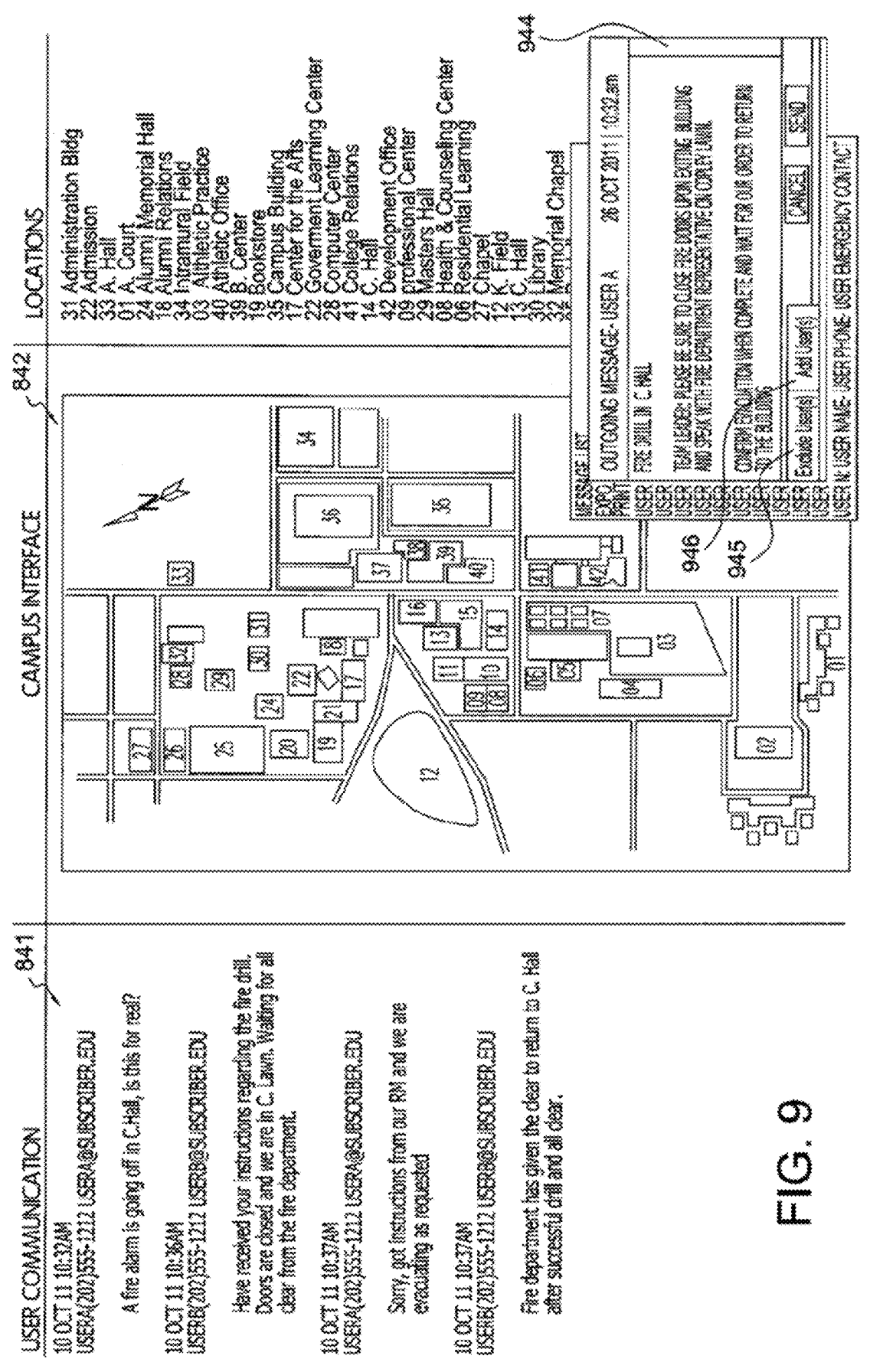
Figure 10:
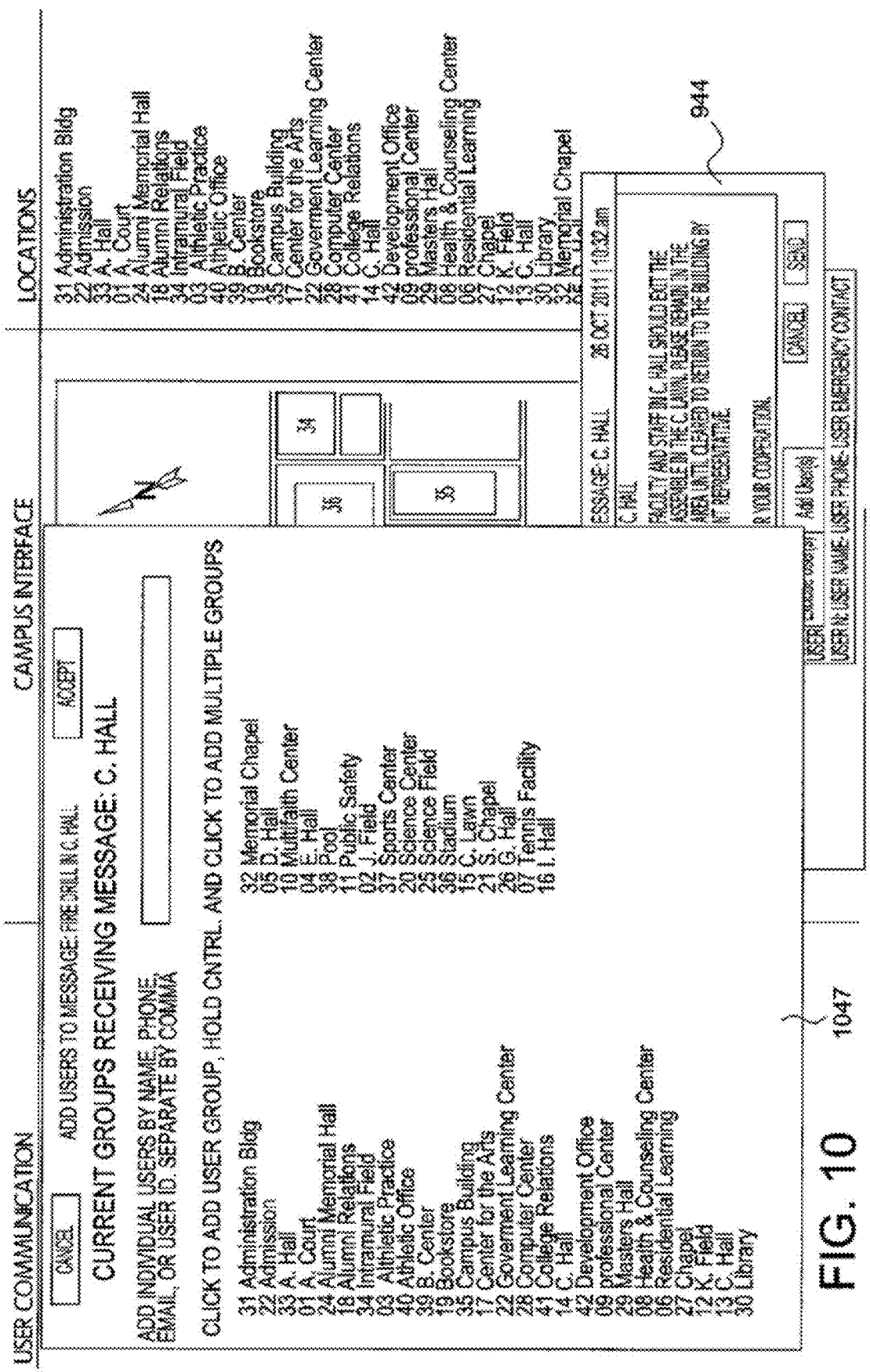
Figure 11:
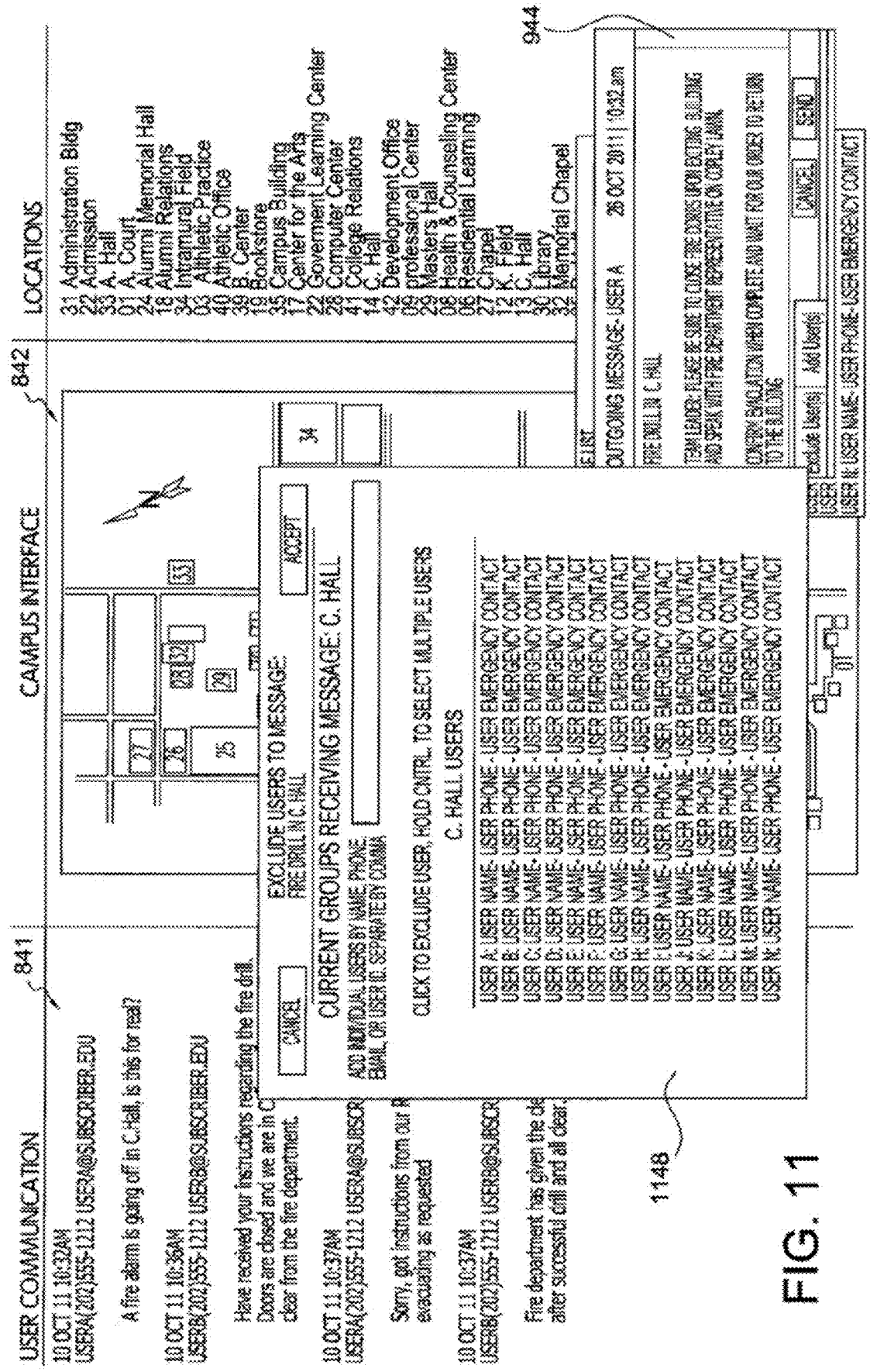
Figure 12:
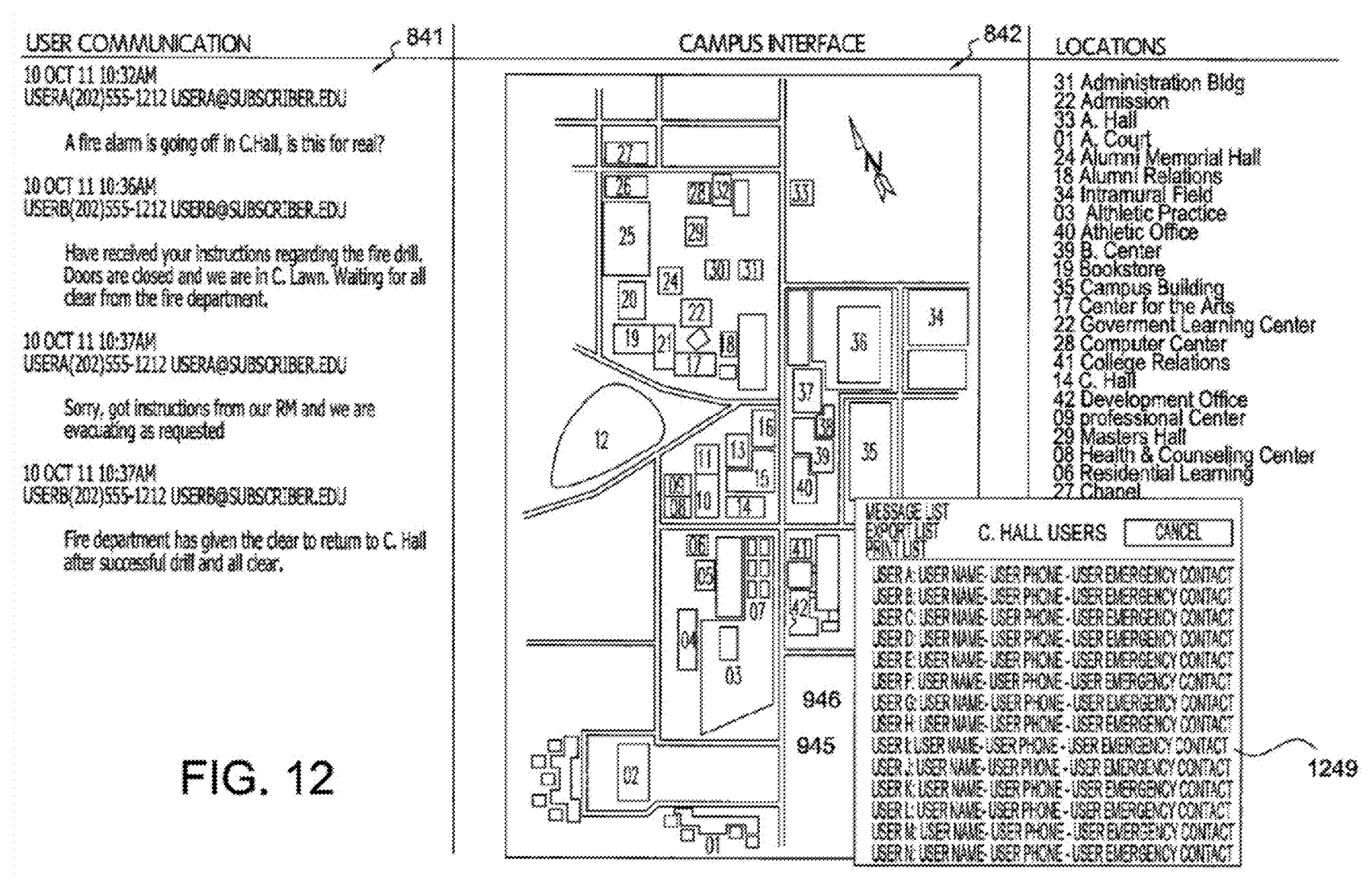
Figure 13:
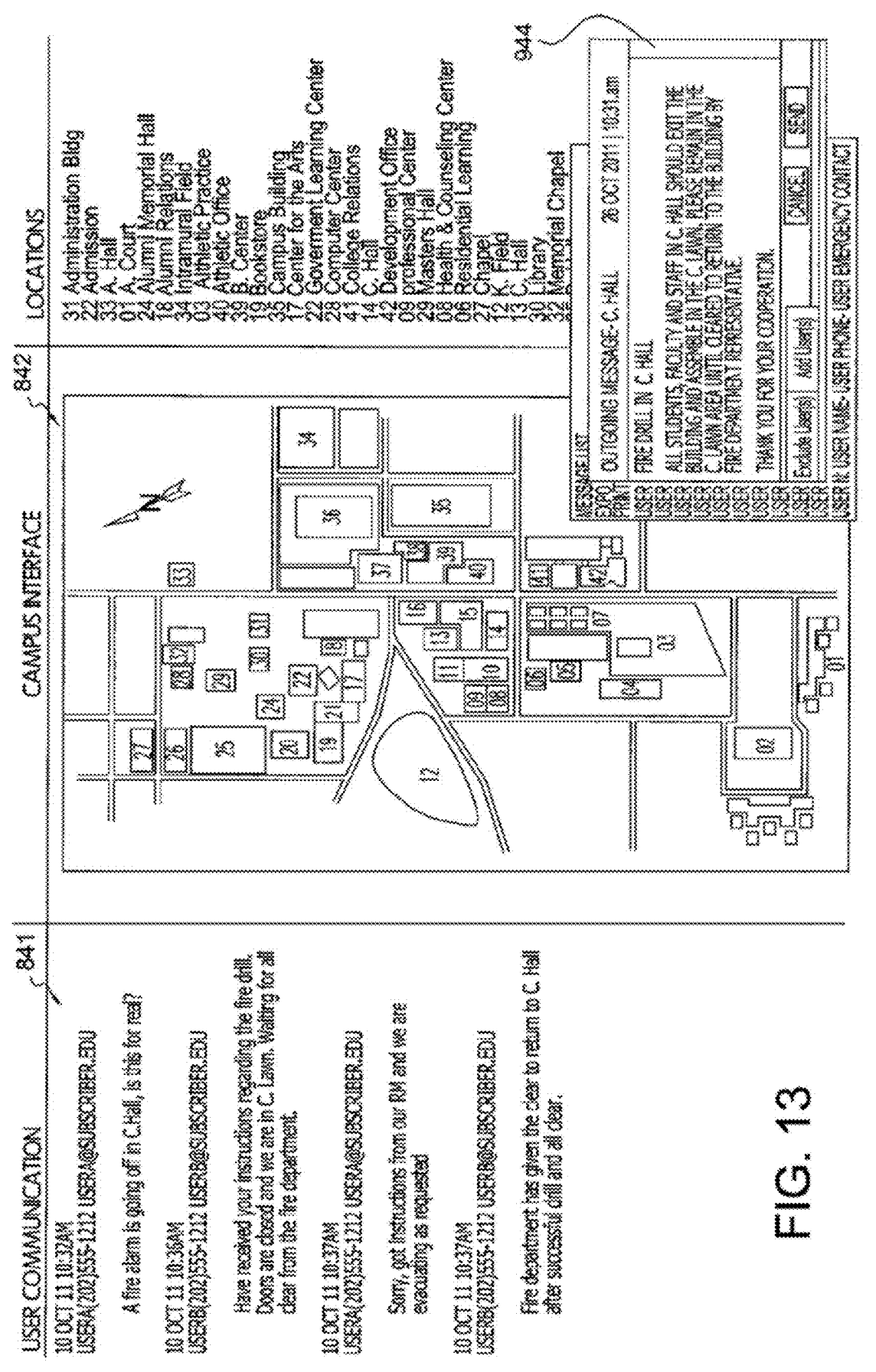

In same or different embodiment, by way of non-limiting example with reference to FIGS. 8-14, the graphical interface messaging may occur as follows: the system administrator logs into mapping module 158, and graphical representation of target geographical area is loaded to graphical user interface (FIG. 8); an emergency message dialogue space 841 populates on the left side of the map interface 842. User submitted emergency trigger messages populated to the emergency message dialogue space 841 in real time. As shown in FIG. 8, the information shown in emergency message dialogue space 841 can include, for example, user name, identification number, phone number, email, location information, etc. from the user profiles. As shown in FIG. 9, a system administrator can click on an incoming message to open a message pop-up box 944, which includes the user as the initial recipient and includes an exclude button 945 to exclude users as recipients and an add button 946 to add users as recipients. As shown in FIGS. 10-12, the system administrator may select, add, and exclude users to finalize recipient rules lists using windows 1047 (FIG. 10) and 1148 (FIG. 11). Notification module 155 can populate recipient rules list in window 1249, as shown in FIG. 12. As illustrated in FIGS. 13-14, the system administrator can use notification module 155 can send message 1450 to the recipient. After procedure 696, activity 289 is complete.

Figure 7:
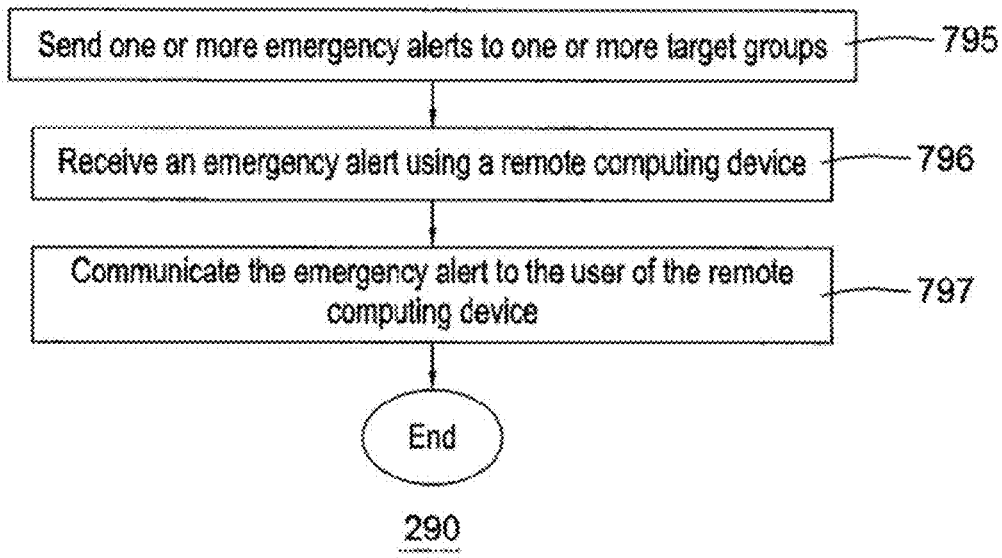
FIG. 7 illustrates a flow chart for an exemplary embodiment of an activity of sending the first emergency alert message, according to the first embodiment.

Next, referring again to FIG. 2, method 200 of FIG. 2 includes an activity 290 of communicating one or more emergency alerts to the target groups. FIG. 7 illustrates a flow chart for an exemplary embodiment of activity 290 of communicating the first emergency alert message to one or more target groups, according to the first embodiment.

Referring to FIG. 7, activity 290 includes a procedure 795 of sending one or more emergency alerts to one or more target groups. In some examples, notification module 155 (FIG. 1) can send the emergency alerts to the target groups.

When message and recipient rules functions are complete, the system administrator hits "send," and the message is distributed according to the rules list with "[Subscriber Name] Emergency Message."

The system administrator's login identification, time, date and location can be recorded to an emergency message log; and an email may be sent to the subscriber email designated for receipt of emergency messages with such information and a copy of the message.

Activity 290 in FIG. 7 continues with a procedure 796 of receiving an emergency alert using a remote computing device. In some examples, emergency communications module 110, 143 and/or 144 can receive an emergency alert from notification module 155 (FIG. 1) via communications network 108 (FIG. 1).

Subsequently, activity 290 of FIG. 7 includes a procedure 797 of communicating the emergency alert to the user of the remote computing device. In some examples, the emergency alert can be communicated to the user of the remote computing device 102, 103, and/or 104 using a display on the device. In some embodiments, procedure 797 can be part of procedure 795. After procedure 797, activity 290 is complete, and method 200 is complete when the emergency level is a second level of response emergency.

Referring back to FIG. 2, if the emergency level is a first level of response, method 200 in FIG. 2 includes an activity 291 of notifying the appropriate first response unit if the level of response after activity 286 of determining the emergency level. In some examples, notifying the appropriate first level response unit can be similar to activity 289. After activity 291, method 200 is complete when the emergency level is a first level of response emergency.

Figure 15:
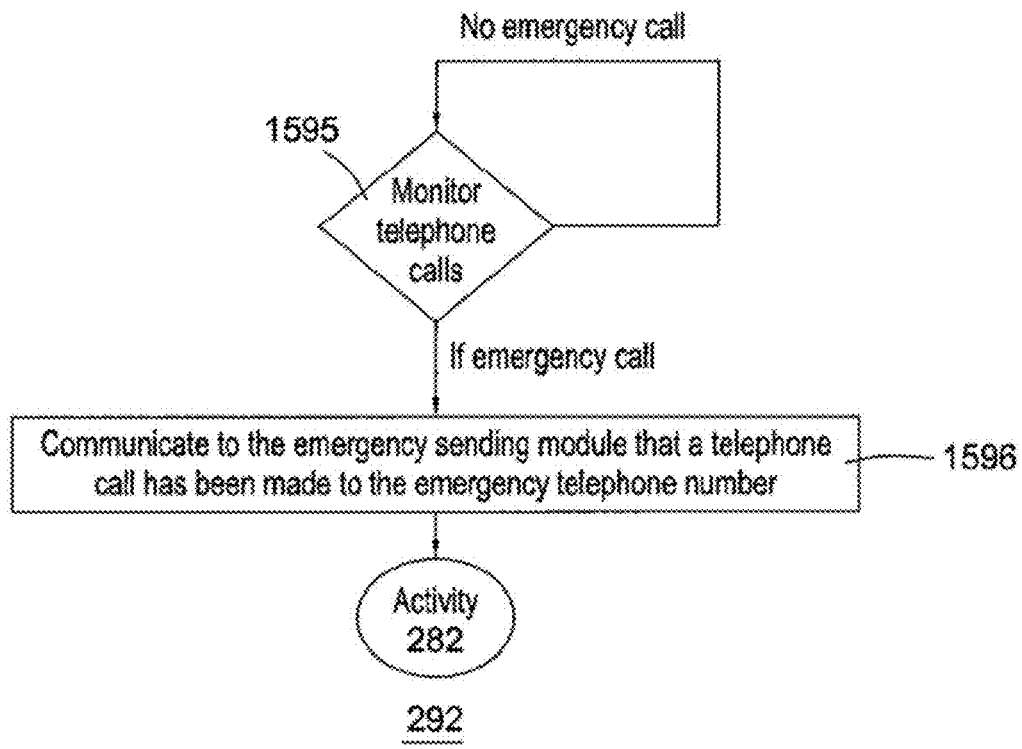
FIG. 15 illustrates a flow chart for an exemplary embodiment of an activity of monitoring telephone communications, according to the first embodiment.

Method 200 also includes an activity 292 of monitoring telephone communications. In some examples, the emergency messaging system can monitor telephone calls made using remote computing device to determine if any telephone calls were made to an emergency number. FIG. 15 illustrates a flow chart for an exemplary embodiment of activity 292 of monitoring telephone communications, according to the first embodiment.

Referring to FIG. 15, activity 292 includes a procedure 1595 of monitoring telephone calls to determine if any telephone calls have been made to an emergency telephone number. In one example, referring to FIG. 1, monitoring module 112 can monitor the telephone call log of storage device 122 to determine if any telephone calls have been made to an emergency telephone number within a predetermined time period (e.g., one, five, ten, or thirty minutes). In another example, monitoring module 112 can monitor the number of outgoing telephone calls when the outgoing telephone call is made to determine if the telephone call is being made to an emergency number.

Activity 292 in FIG. 15 continues with a procedure 1596 of communicating to the emergency sending module that a telephone call has been made to the emergency telephone number. In some examples, the fact that an emergency call was made to an emergency number can be considered receiving an emergency trigger message from the user of the remote computing device. In various embodiments, after procedure 1596, activity 292 is complete, and the next activity is activity 282.

Figure 16:
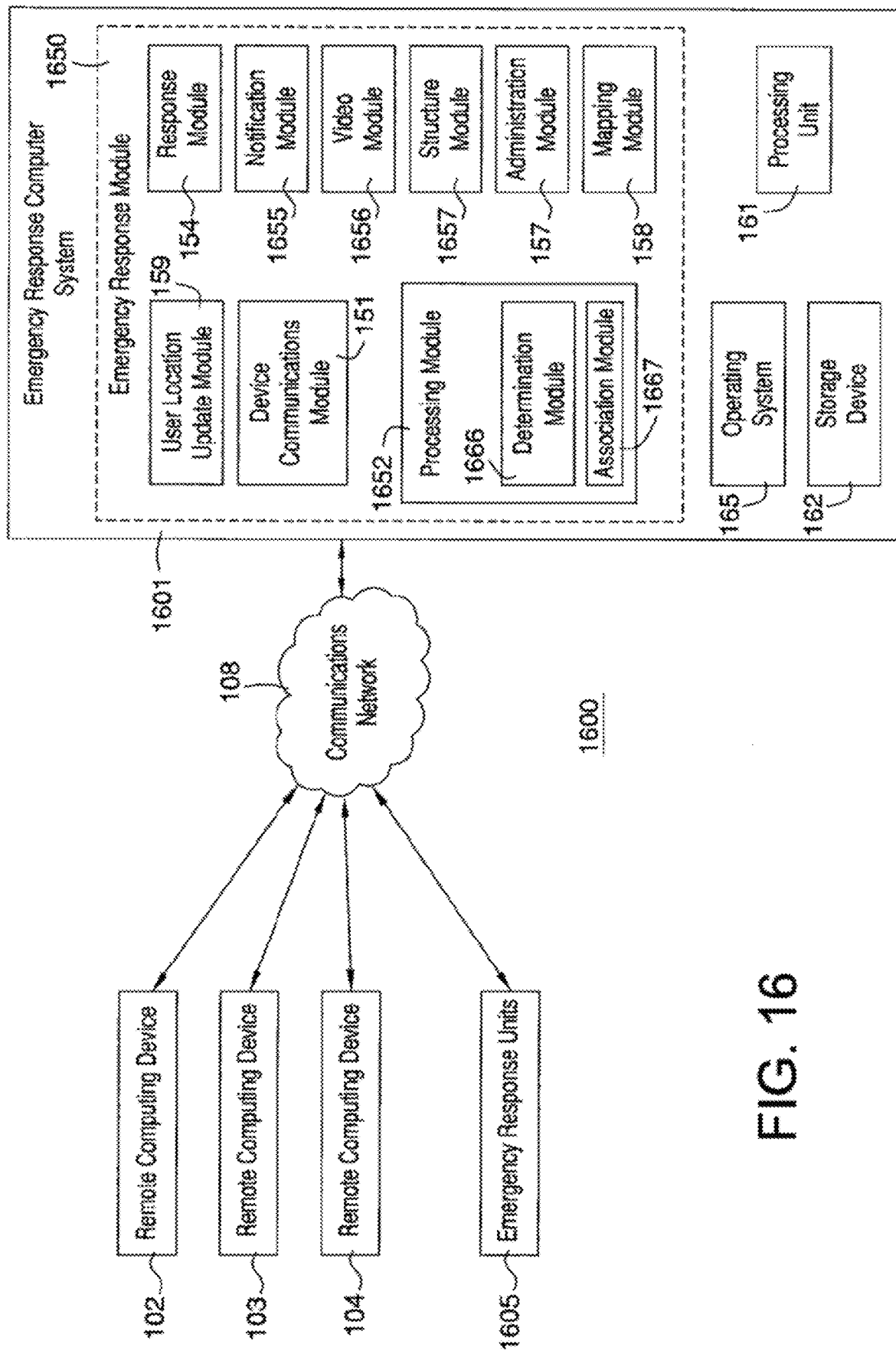
FIG. 16 illustrates a block diagram of an emergency messaging system, according to a second embodiment.

Turning to another embodiment, FIG. 16 illustrates block diagram of an emergency messaging system 1600, according to a second embodiment. Emergency messaging system 1600 is merely exemplary and is not limited to the embodiments presented herein. Emergency messaging system 1600 can be employed in many different embodiments or examples not specifically depicted or described herein.

Emergency messaging system 1600 can be a system configured to dispatch emergency response to a person when the person uses a wireless remote computing device to send an emergency message (e.g., a text message or a telephone call from a wireless device). Current emergency response systems allow a person to call a special number (e.g., 911 in the United States) to be connected to the local emergency response units regardless of location, but current systems are limited in their abilities in the type of communications and the ability to precisely locate the person sending the message. For example, current emergency response systems accept only voice telephone calls to report an emergency. A person currently cannot send a SMS (short message service; i.e., a text) to report an emergency because the telephone carrier infrastructure do not support this capability due to an inability to determine accurately and quickly the location of a sender of an SMS message.

Similarly, current emergency messaging systems' ability to locate a person calling from a wireless device is limited. Current wireless telephone network infrastructures allow only estimates of a location of a wireless device to within 30 meters, which can be inadequate in some situations and locations (e.g., locating an emergency in a high-density urban location)

Emergency messaging system 1600 overcomes these problems of a current emergency messaging system by providing a system that allows users to send emergency messages via text messages and provides a more accurate method of locating the sender of the emergency message.

In some embodiments, emergency messaging system 1600 is designed to allow node type integration for lesser functional users who might not be considered "emergency response unit." In one example, emergency messaging system 1600 could be used by a grade school that does not have emergency response as its primary purpose, but does want to be in the communication stream when an emergency occurs and may have an information communication response obligation to staff, students and/or parents of its students.

In some embodiments, an emergency messaging system 1600 (i.e., a messaging system) can include: (a) a response computer system 1601; (b) two or more remote computing devices 102, 103, and 104; (c) one or more emergency response units 1605. In some examples, response computer system 1601, remote computing devices 102, 103, and 104, and emergency response units 1605 can be configured to communicate using communications network 108.

In other embodiments, emergency messaging system 1600 can be considered to include: (a) an emergency response module 1650 (i.e., a response module) configured to run on processing unit 161 of emergency response computer system 1601; (b) an emergency communications module 110 (i.e., a communications module) configured to run on processing unit 121 of remote computing device 102; (c) an emergency communications module 143 (i.e., a communications module) configured to run on a processing unit of remote computing device 103; and (d) an emergency communications module 144 (i.e., a communications module) configured to run on a processing unit of remote computing device 104.

Emergency response computer system 1601 can include: (a) at least one processing unit 161; (b) emergency response module 1650 (i.e., a response module) configured to run on processing unit 161; (c) a storage device 162; and (d) an operating system 165 configured to run on processing unit 161.

Emergency response units 1605 can include local police departments, fire departments, and local emergency response teams. For example, on a university campus, emergency response units 1605 can be the university police department. In another example, in a city, the emergency response unit can be the city police department, the city fire department, and/or the city's EMT (emergency medical technicians) department. Generally, emergency response units 1605 for a geographic area includes the one or more emergency response units (police, fire, EMT, etc.) responsible for responding to an emergency in the geographic area, regardless of whether the responsible emergency response unit is associated with a city, county, state, province, parish, another political subdivision, university or college, or business. In some examples, emergency response units 1605 include first level response units 105 (FIG. 1). In other examples, emergency response units include first level response units 105 and second level response units 106 (FIG. 1).

In many embodiments, emergency response module 1650 can include: (a) a device communications module 151 configured to receive two or more emergency trigger messages and location information from one or more users via remote computing device 102, 103 or 104; (b) a processing module 1652; (c) a notification module 1655; (d) a video module 1656; (e) a structure module 1657; (f) user location update module 159; (g) administration module 157; and (h) mapping module 158.

Processing module 1652 can be configured to receive the location information of the remote computing device sending the emergency trigger information (the "emergency location") from device communication module 151 and process the emergency location information. In some examples, processing module 1652 can include: (a) a determination module 1666 configured to run on processing unit 161 and further configured to use the location of the remote computing device sending the emergency trigger message to determine an appropriate emergency response unit to notify; and (b) an association module 1667 configured to run on processing unit 161 and further configured to associate one or more locations with one or more emergency response units 1605.

Notification module 1655 can be configured to run on processing unit 161 and further configured to notify the appropriate emergency response unit. In some examples, determination module 1666 can communicate to notification module 1655 the appropriate emergency response unit, and notification module 1655 can forward the emergency trigger message and the location information to the appropriate emergency response unit. If the emergency trigger message is a telephone call, notification module 1655 can immediately forward the telephone call to the appropriate emergency response unit, along with the location information.

The automatic notification in the present invention differs from prior art PSAP systems and other emergency response systems which require the emergency information to be first routed to a human dispatcher before the information is made available to the emergency responders. This lack of automatic notification in the prior art can delay the response time and may have catastrophic consequences when dispatchers are overwhelmed. According to the present invention, the emergency system's computer processor performs the analyses to determine the appropriate types of emergency response groups and also determine the appropriate emergency response unit that should be notified about the emergency with the corresponding location of the mobile computing device that sent the emergency request. The system's computer processor also automatically communicates the information to the appropriate emergency response unit. In comparison, traditional emergency response systems and traditional PSAP systems would require the emergency dispatcher to manually perform the evaluations and then take action to communicate the information to the emergency response units.

The difference between the computerized operations of the present invention and the manual operations of traditional emergency response systems can have life and death consequences. For example, in a situation where there are multiple emergencies in a short period of time in a particular locality, such as in the November 2015 Paris terrorist attacks, PSAP operators can become overwhelmed which results in longer times for the PSAP operators to determine and dispatch the emergency response units and delays in the emergency response units arriving at the locations of the emergencies. In comparison, the computerized operations of the present invention would determine the appropriate emergency response units for respective emergencies and send the emergency and location information to these emergency response units.

In the particular example of the November 2015 Paris terrorist attacks where there had been a series of coordinated attacks, the first attack occurred near the sports stadium. Even though there had been rapid response emergency teams deployed around Paris due to heightened terror warnings, the initial attack overwhelmed the PSAP dispatchers so that when the subsequent attacks occurred, the rapid response emergency teams were delayed in being deployed. In comparison, with a PSAP system that operates in conjunction with the present invention, even when the PSAP dispatchers are overwhelmed with the initial emergency calls, the emergency response computer system would continue to receive the emergency messages from people with mobile computing devices at the other targeted locations. The computer determines the appropriate rapid response emergency teams for the locations and sends the emergency and location information to the emergency teams. Accordingly, the invention operates in a fundamentally different manner than traditional emergency response systems.

Another example comparing how traditional emergency response systems operate with the automatic notification operation of the present invention indicates how the differences have life and death consequences when implemented in a real-life emergency response operations center. For example, in large cities where there could be dozens of emergency operators and dispatchers along with numerous supervisors and other emergency officials. It is recognized in the prior art that the emergency call centers can be "overwhelmed" but the prior art emergency response systems only still leaves the most intense and pressing emergencies for manual evaluation of the content of messages. When there are dozens of operators, there is no possible way that the operators using the traditional emergency response systems can communicate with each other and with the people requesting emergency services in order to quickly determine the scale and urgency of an emergency situation. In comparison, the present invention uses a computer processor running the emergency response module to determine locations of the remote computing devices, analyzes the content of the emergency trigger messages, determines the level of emergency according to the locations and the content, and automatically notifies the closest available response unit. Accordingly, the computer processor operations of the emergency response module are integrated in a way that is entirely different from and far superior than the manual operations of traditional emergency response systems.

Video module 1656 can be configured to run on processing unit 161 and further configured to determine whether a live video feed exists for the emergency location. If live video feed exists for the emergency location, video module 1656 can be configured to provide access to the live video feed for the emergency location to emergency response units 1605. In some examples, video module 1656 can be configured to communicate with police departments, governmental transportation authorities, private video sources, and other sources to have access to their video feeds in case of an emergency event. In many embodiments, video module 1656 can be configured such that video module 1656 accesses information stored in storage device 162 that includes a list of live video feeds available for usage and connection information for these video feeds.

Structure module 1657 can be configured to run on processing unit 161 and further configured to: (a) determine whether a structure exists at the emergency location; (b) determine whether a schematic exist for the structure; and (c) provide access to the schematic of the structure to emergency response unit(s) 1605 if the schematic exists for the structure. In some examples, structure module 1657 can be further configured to provide information about a location of one or more persons in the structure to the emergency response units.

Figure 17:
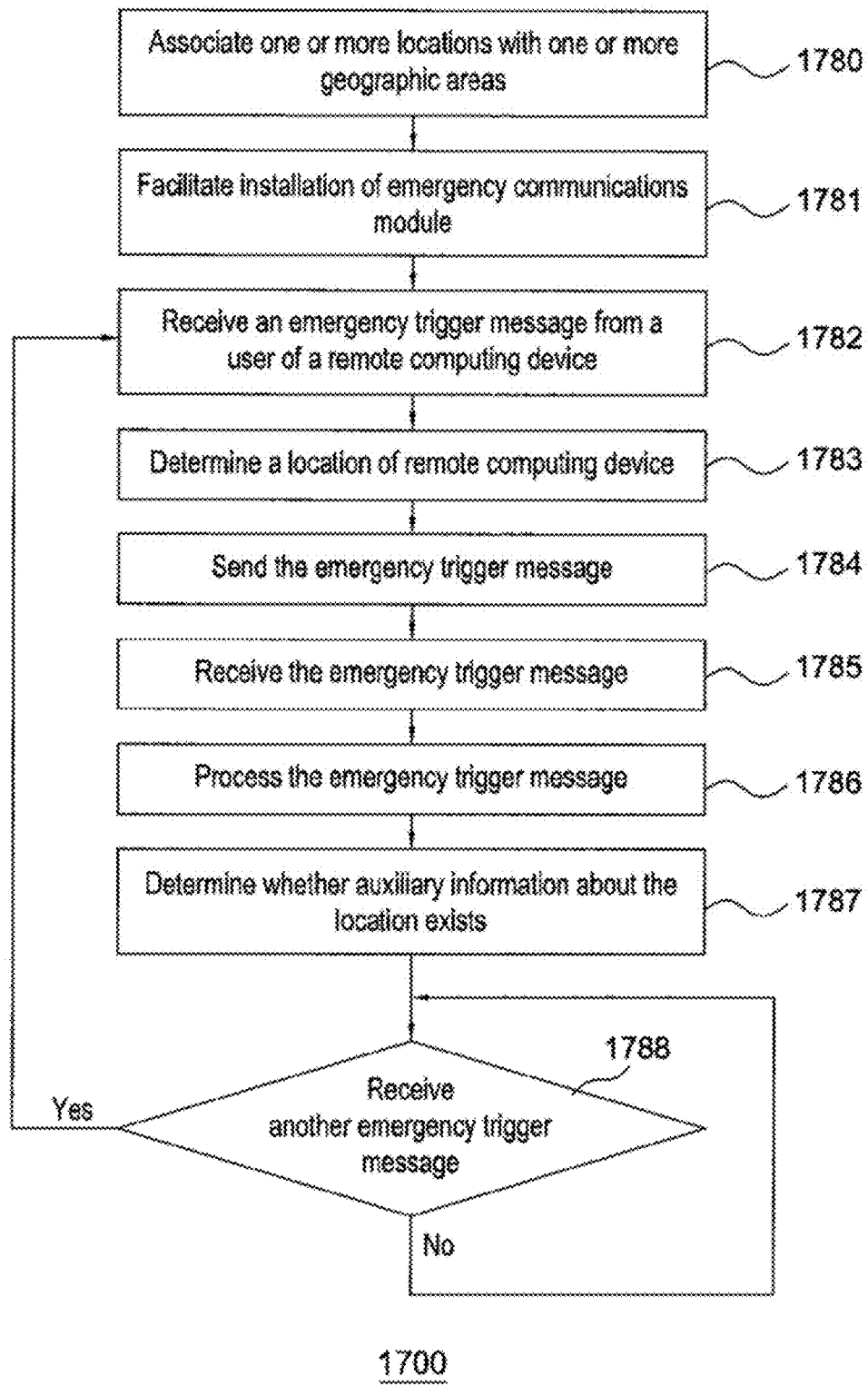
FIG. 17 illustrates a flow chart for an embodiment of a method of responding to an emergency, according to the second embodiment.

FIG. 17 illustrates a flow chart for an embodiment of a method 1700 of responding to an emergency, according to a second embodiment. Method 1700 is merely exemplary and is not limited to the embodiments presented herein. Method 1700 can be employed in many different embodiments or examples not specifically depicted or described herein. In some embodiments, the activities, the procedures, and/or the processes of method 1700 can be performed in the order presented. In other embodiments, the activities, the procedures, and/or the processes of method 1700 can be performed in any other suitable order. In still other embodiments, one or more of the activities, the procedures, and/or the processes in method 1700 can be combined or skipped.

Method 1700 of FIG. 17 include an activity 1780 of associating one or more locations with one or more emergency response units. In some examples, association module 1667 (FIG. 16) can associate one or more geographic areas with one or more emergency response units. For example, FIGS. 18A and 18B illustrate examples of a map 1800 of a geographic association of locations and emergency response units, according to an embodiment. As shown in the map of FIG. 18A, different geographic areas 1807, 1808, 1809, and 1810 can be associated with different emergency response units. In the example shown in FIG. 18A, a first emergency response unit can be associated with geographical area 1807, a second emergency response unit can be associated with geographical area 1808, a third emergency response unit can be associated with geographical area 1809, and a fourth emergency response unit can be associated with geographical area 1810. FIG. 18B shows an example of how overlapping geofences allow delivery of an emergency event to one or more agencies based on the location of a mobile device. These are approximations of three police municipalities 1822a, 1822b, 1822c within a single fire protection district 1820. Each of the municipalities has their own law enforcement services. The fire protection agency provides fire and emergency medical for some or all of each of the three included municipalities and of other municipalities not defined in this figure.

In activity 1780, a user of emergency response computer system 1601 (FIG. 16) can load information regarding the associations into emergency response computer system 1601 (FIG. 16), and association module 1667 (FIG. 16) can create associations between various locations and various emergency response units. In some examples, a user of emergency response computer system 1601 can use a visual mapping tool to load the association data. In other examples, the information can be loaded using different processes.

Next, method 1700 of FIG. 17 includes an activity 1781 of facilitating installation of the emergency communication module on the one or more mobile computing devices. In some examples, the installation of the emergency communications module can be facilitated by providing the application, providing instructions for installation, and/or providing the application to a third party, who provides the application to the user.

Referring again to FIG. 17, method 1700 includes an activity 1782 of receiving an emergency trigger message from a user of a remote computing device. In some embodiments, the emergency trigger message is received from a user of the remote computing device using an emergency sending module of an emergency communications module. The emergency communications module and emergency sending module can be running on a processor of the remote computing device.

Referring to FIG. 1, for example, a user can activate emergency communications module 110 on remote computing device 102, and emergency sending module 111 can be opened. Emergency sending module 111 can present a user of remote computing device 102 a window on display 131 into which the user can type the emergency trigger message using input device 132. In some examples, the emergency trigger message is a text message, and the user can type the text message into the window of emergency sending module 111. In other examples, the emergency trigger message can be a sound recording, and the user can record the emergency trigger message using input device 132. In other examples, the emergency trigger message can be a telephone call, and the user can initiate the telephone call using input device 132.

Referring again to FIG. 17, method 1700 in FIG. 17 continues with an activity 1783 of determining a location of the remote computing device. In some examples, a location determination module 113 (FIG. 1) can determine the location of remote computing device 102 (FIGS. 1 and 16).

Referring to FIG. 17, for example, after the user submits the emergency trigger message, emergency sending module 111 can request the current location of remote computing device 102 from location determination module 113. In other examples, emergency sending module 111 can request the current location of remote computing device 102 from location determination module 113 when the user activates emergency communications module 110 or when the user begins entering the emergency trigger message into remote computing device 102. After location determination module 113 determines the location, location determination module 113 can communicate the location to emergency sending module 111. In various embodiments, location determination module 113 can determine the location of remote computing device 102 at predetermined intervals (e.g., ten seconds, one minute, ten minutes, and one hour intervals).

Referring back to FIG. 17, method 1700 includes an activity 1784 of sending the emergency trigger message to the emergency response computer system. In some examples, sending the emergency trigger message can include sending an audio recording or text message with the location to the response computer system using the emergency module. In other examples, sending the emergency trigger message can include a telephone call to a human operator in communication with response computer system 101.

Referring to FIG. 1, for example, after the user submits the emergency trigger message and emergency sending module 111 receives the current location information from location determination module 113, emergency sending module 111 sends the emergency trigger message and the current location information to device communications module 151 over communications network 108. In other examples, if emergency sending module 111 does not receive (or location determination module cannot determine) the current location information within a predetermined period of time (e.g., 1, 5, 10, or 30 seconds), emergency sending module 111 can send the emergency trigger message to device communications module 151 without the current location information. In the examples where the current location information is not available, emergency sending module 111 can send the most recent location information available along with the timestamp for the location information. Furthermore, when the current location information is not available, emergency sending module 111 can send the information as soon as it becomes available.

Next, method 1700 of FIG. 17 includes an activity 1785 of receiving the emergency trigger message from the remote computing device. In some examples, the emergency response computer system can receive emergency trigger messages from the users via two or more remote computing devices.

In some examples, receiving the emergency trigger message can include receiving a text message from the user of the remote computing device. In various embodiments, receiving the emergency trigger message further can include receiving an audio recording. The audio recording can be a recording made by a user of a remote computing device. In still another example, receiving the emergency trigger message can include receiving a telephone call from the user of the remote computing device.

Method 1700 in FIG. 17 continues with an activity 1786 of processing the emergency trigger message. FIG. 19 illustrates a flow chart for an exemplary embodiment of activity 1785 of processing the emergency trigger messages, according to the second embodiment.

Referring to FIG. 19, activity 1786 includes a procedure 1995 of determining one or more emergency response units associated with the location of the remote computing device (i.e., the emergency location). In various embodiments, determination module 1666 (FIG. 16) can determine the emergency response units associated with the emergency location. For example, determination module 1666 can access the association databases stored in storage device 162, which were created in activity 1780 (FIG. 17), to determine the emergency response units associated with the emergency location.

In various examples, if the remote computing device is transmitting in its location at predetermined intervals, determination module 1666 can determine when emergency response module 150 (FIG. 1) receives the new location information what emergency response units are associated with the remote computing device's current location and store that information in a database of storage device 162. For example, if a remote computing device moves from geographical area 1807 (FIG. 18) to geographical area 1808 (FIG. 18), determination module 1666 can change the emergency response unit associated with the remote computing device from the first emergency response unit to the second emergency response unit. In the same or different examples, device communications module 151 (FIG. 1) can communicate to the remote computing device that identity of the emergency response units when the emergency response unit associated with the remote computing device's location change.

Subsequently, activity 1786 includes procedure 1996 of providing the emergency trigger message to the appropriate one or more emergency response units. In some examples, determination module 1666 (FIG. 16) can communicate the appropriate emergency response units to notification module 1655. Notification module 1655 can provide the emergency trigger message along with the location information to the appropriate response units. In many examples, procedure 1996 can be similar or the same as activity 291 and/or 288 of FIG. 2. After procedure 1996, activity 1786 is complete.

Figure 20:
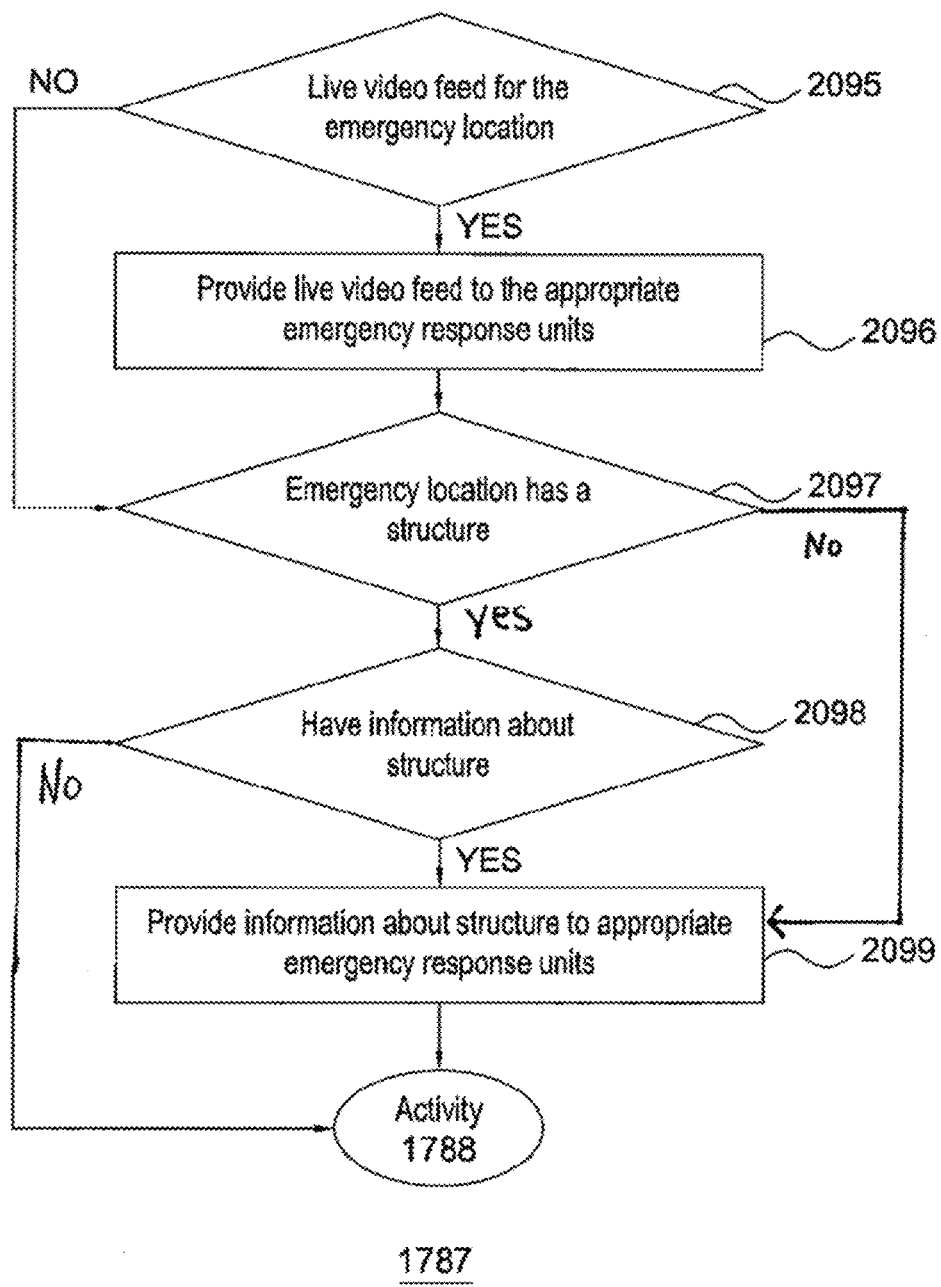
FIG. 20 illustrates a flow chart for an exemplary embodiment of an activity of determining whether auxiliary information about the emergency location exists, according to the second embodiment.

Referring again to FIG. 17, method 1700 continues with an activity 1787 of determining whether auxiliary information about the emergency location exists. FIG. 20 illustrates a flow chart for an exemplary embodiment of activity 1787 of whether auxiliary information about the emergency location exists, according to the second embodiment.

Referring to FIG. 19, activity 1787 includes a procedure 2095 of determining whether a live video feed exists for the emergency location. In some examples, video module 1656 (FIG. 16) can query the databases stored in storage device 162 (FIGS. 1 & 16) to determine whether a live video feed exists for the emergency location. For example, video module 1656 (FIG. 16) can then determine whether there are any geo-fenced video cameras accessible for that location by cross-referencing the emergency location with geo-fenced camera IP address feeds. If a live video feed exists, the next procedure in activity 1787 is a procedure 2096. If a live video feed does not exist, the next procedure is a procedure 2097.

If a live video feed exists, procedure 2096 of activity 1787 is performed and involves providing the live video feed to the appropriate emergency response units. For example, video module 1656 (FIG. 16) can allow the appropriate emergency response unit to access the video feed through tactical emergency management interface and captured in an event log with the call. The tactical emergency management interface of video module 1656 (FIG. 16) can allow a member of the emergency response unit to draw a polygon onto a GPS integrated map to overlay a video camera field of vision "footprint" in order to allow automatic access of the video camera feed in a tactical emergency management interface.

Activity 1787 of FIG. 20 includes a procedure 2097 of determining whether a structure exists at the emergency location. In some examples, structure module 1657 (FIG. 16) can query the databases stored in storage device 162 (FIGS. 1 & 16) to determine whether a structure exists for the emergency location. For example, video module 1656 can then determine whether there are any geo-fenced video cameras accessible for that location by cross-referencing the emergency location with geo-fenced camera IP address feeds. If a structure does not exist at the emergency location, the next activity is activity 2099.

If a structure exists at the emergency location, activity 1787 of FIG. 20 includes a procedure 2098 of determining whether any information about the structure is available. For example, structure module 1657 (FIG. 16) can determine whether there are any geo-fenced building schematics accessible for the emergency location by cross-referencing the emergency location with geo-fenced building schematic feeds. In the same or different example, structure module 1657 (FIG. 16) can query the databases stored in storage device 162 (FIGS. 1 & 16) to determine whether information about the structure at the emergency location exists. If no information about the structure is available, then activity 1787 is complete and the next activity is activity 1788.

If information about the structure is available, activity 1787 of FIG. 20 includes a procedure 2099 of providing the information about the structure to the appropriate emergency response units. In some examples, structure module 1657 (FIG. 16) can provide various types of information about the structure to the appropriate emergency response units.

Referring to FIG. 16, in some embodiments, structure module 1657 can provide building schematics of the structure to the appropriate emergency response units. For example, structure module 1657 can allow a member of an emergency response unit to draw a polygon onto a GPS integrated map to overlay a building's two-dimensional footprint in order to allow automatic access of the schematic into a tactical emergency management interface of structure module 1657.

In the same or different embodiments, structure module 1657 can determine whether any individuals are in the structure and their locations. For example, structure module 1657 can access a database in storage device 162 that includes information regarding the locations of remote computing devices 102, 103, and 104. Structure module 1657 can determine whether any of remote computing devices 102, 103, or 104 are located in the structure at the emergency location. In various examples, structure module 1657 can plot the locations of any remote computing devices, which are located in the structure, into a building schematic. Structure module 1657 can allow a member of the emergency response unit to draw a polygon onto a GPS integrated map to overlay a building's three-dimensional "schematic" in order to allow automatic access of the schematic into a tactical emergency management interface, with locations of individuals plotted into the schematic using the appropriate X, Y, and Z axis information.

In still the same or a different embodiment, structure module 1657 can provide automatic first responder assistance. For example, structure module 1657 can use specific user locations within a building schematic to trigger predefined ingress/egress/evacuation plans and provide these to appropriate emergency response units. Ingress, egress, tactical planning and other emergency responder information associated locations within a building schematic can be stored in storage device 162. By defining target locations within the building schematic, structure module 1657 can provide instructions for ingress, egress, potential hazards, and scenario specific alternatives. In other embodiments, structure module 1657 can provide other information about the structure at the emergency location to the appropriate emergency response units. After procedure 2099 (FIG. 17), activity 1787 is complete.

Referring again to FIG. 17, the next activity in method 1700 of FIG. 17 is an activity 1788 of determining whether another emergency trigger message has been received. If another emergency trigger message is received, the next activity is activity 1782. If no emergency message is received, activity 1788 is repeated.

Figure 21:
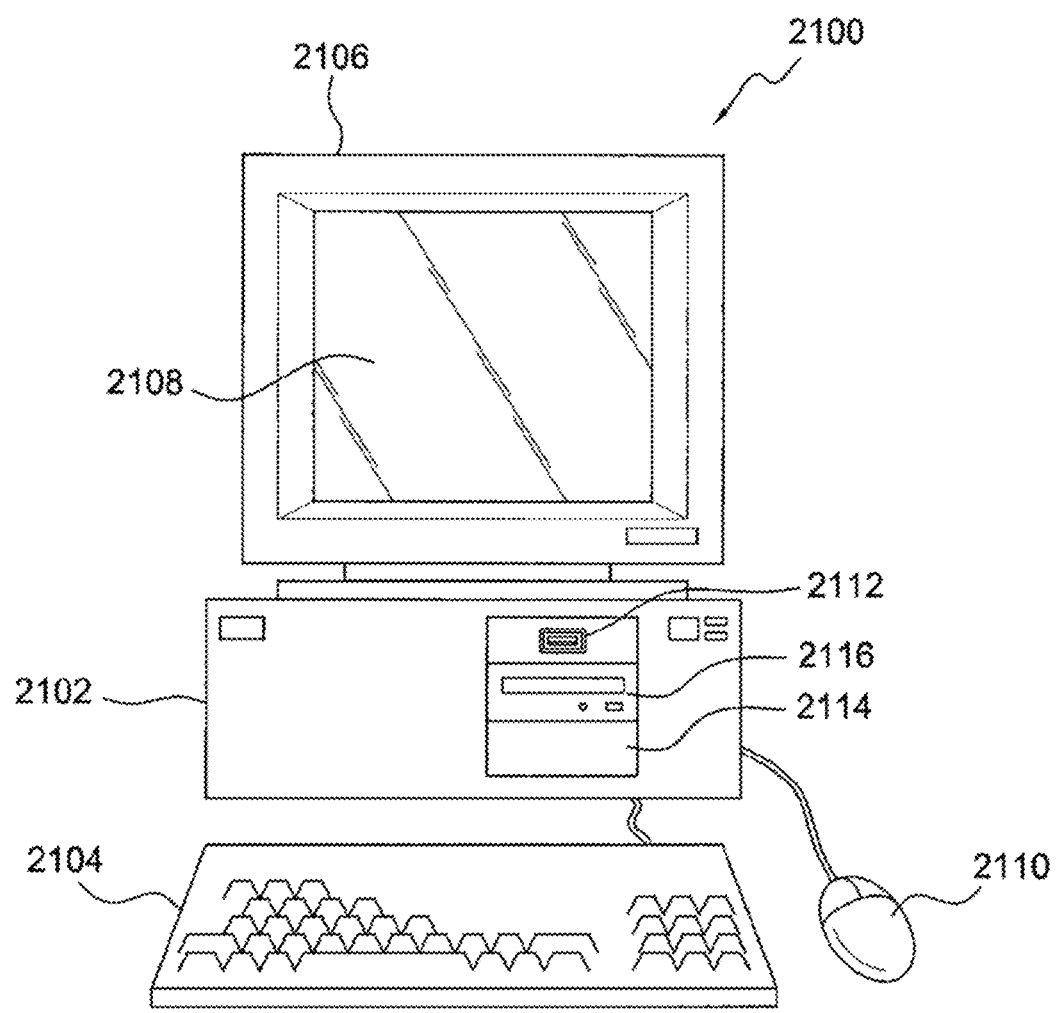
FIG. 21 illustrates a computer that is suitable for implementing an embodiment of emergency messaging system of FIG. 1.
Figure 22:
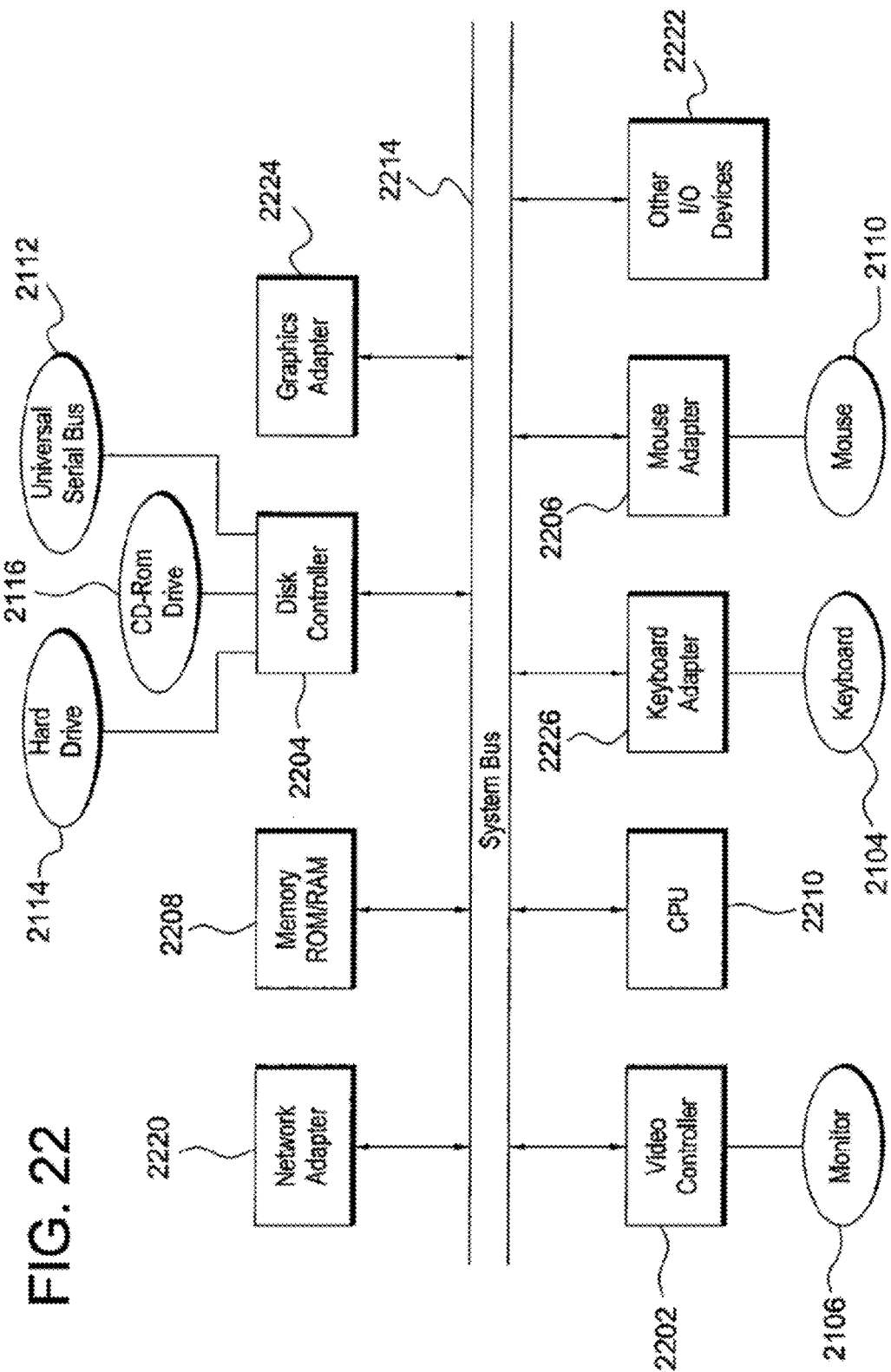
FIG. 22 illustrates a representative block diagram of an example of the elements included in the circuit boards inside chassis of the computer of FIG. 21.

FIG. 21 illustrates a computer 2100 that is suitable for implementing an embodiment of at least a portion of response computer system 101 (FIG. 1). Computer 2100 includes a chassis 2102 containing one or more circuit boards (not shown), a USB (universal serial bus) port 2112, a Compact Disc Read-Only Memory (CD-ROM) and/or Digital Video Disc (DVD) drive 2116, and a hard drive 2114. A representative block diagram of the elements included on the circuit boards inside chassis 2102 is shown in FIG. 22. A central processing unit (CPU) 2210 in FIG. 22 is coupled to a system bus 2214 in FIG. 22. In various embodiments, the architecture of CPU 2210 can be compliant with any of a variety of commercially distributed architecture families.

System bus 2214 also is coupled to memory 2208 that includes both read only memory (ROM) and random access memory (RAM). Non-volatile portions of memory 2208 or the ROM can be encoded with a boot code sequence suitable for restoring computer 2100 (FIG. 21) to a functional state after a system reset. In addition, memory 2208 can include microcode such as a Basic Input-Output System (BIOS). In some examples, storage device 162 (FIG. 1) can include memory 2208, USB drive 2112, hard drive 2114, and/or CD-ROM or DVD drive 2116.

In the depicted embodiment of FIG. 22, various I/O devices such as a disk controller 2204, a graphics adapter 2224, a video controller 2202, a keyboard adapter 2226, a mouse adapter 2206, a network adapter 2220, and other I/O devices 2222 can be coupled to system bus 2214. Keyboard adapter 2226 and mouse adapter 2206 are coupled to a keyboard 2104 (FIGS. 21 and 22) and a mouse 2110 (FIGS. 21 and 22), respectively, of computer 2100 (FIG. 21). While graphics adapter 2224 and video controller 2202 are indicated as distinct units in FIG. 22, video controller 2202 can be integrated into graphics adapter 2224, or vice versa in other embodiments. Video controller 2202 is suitable for refreshing a monitor 2106 (FIGS. 21 and 22) to display images on a screen 2108 (FIG. 21) of computer 2100 (FIG. 21). Disk controller 2204 can control hard drive 2114 (FIGS. 21 and 22), floppy disc drive 2112 (FIGS. 21 and 22), and CD-ROM or DVD drive 2116 (FIGS. 21 and 22). In other embodiments, distinct units can be used to control each of these devices separately.

Network adapters 2220 can be coupled to one or more antennas. In some embodiments, network adapter 2220 is part of a WNIC (wireless network interface controller) card (not shown) plugged or coupled to an expansion port (not shown) in computer 2100. In other embodiments, the WNIC card can be a wireless network card built into internal computer 2100. A wireless network adapter can be built into internal client computer 2100 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 2220 can be a wired network adapter.

Although many other components of computer 2100 (FIG. 21) are not shown, such components and their interconnection are well known to those of ordinary skill in the art. Accordingly, further details concerning the construction and composition of computer 2100 and the circuit boards inside chassis 2102 (FIG. 21) need not be discussed herein.

When computer 2100 in FIG. 21 is running, program instructions stored on a USB drive in USB port 2112, on a CD-ROM or DVD in CD-ROM and/or DVD drive 2116, on hard drive 2114, or in memory 2208 (FIG. 22) are executed by CPU 2210 (FIG. 22). A portion of the program instructions, stored on these devices, can be suitable for carrying out method 200 (FIG. 2) and/or method 1700 of FIG. 17 as described previously with respect to FIGS. 1-20.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that parts of method 200 of FIG. 2 and 1700 of FIG. 17 and may be comprised of many different activities, procedures and be performed by many different modules, in many different orders; that any element of FIG. 1 may be modified; and that the foregoing discussion of certain of these embodiments does not necessarily represent a complete description of all possible embodiments.

The current implementation of the system distributes an "Emergency Event" that takes the location from the device and pairs it with a profile managed by the user that enables sharing emergency health information, an image, emergency contacts, etc. with appropriate stakeholders in the community. Threat Escalation is creating a secondary event based on the frequency or content of Emergency Events. The frequency trigger for emergency call/text events creates a secondary Threat Escalation Event based on monitoring the number of emergency call/text events for a defined geographic location, creating a Threat Escalation Event when the frequency of call/text events exceeds a defined threshold. The content trigger for emergency call/text events creates a secondary Threat Escalation Event based on monitoring the content of emergency call/text events for a defined geographic location, creating a Threat Escalation Event when the content of call/text events meets defined criteria.

Additionally, the model for automating the distribution of information deployed in the System is based on representing overlapping stakeholder interests with dynamic, customizable, location definitions. The platform uses geographic definition of a stakeholder interest in a geographic location to automatically distribute a threat escalation event by cross referencing the stakeholder location with the location(s) of the underlying events. For example during a Single Stakeholder Distribution of a Threat Escalation Event where many students use the SirenGPS app to make 911 calls from a campus SirenGPS identifies the frequency of these calls as an escalated threat event and distributes the threat event to University Dispatch. When there is a Single Stakeholder Multiple Party Distribution of a Threat Escalation Event and many students use the SrenGPS app to make 911 calls from a campus. SirenGPS identifies the frequency of these calls as an escalated threat event and distributes the threat event to: University Dispatch, University's Chief of Police, the nearest University patrol officer and other similar parties.

When there is a Distribution of the Threat Escalation to Multiple Stakeholders of a Threat Escalation Event the system employs geographic definition of locations that represent stakeholder interest cross referenced with the geo locations of the underlying Emergency Events to automatically distribute the threat escalation event to overlapping stakeholder interests. For example when there are Multiple Stakeholder, Multiple Party Distribution of a Threat Escalation Event and many students use the SirenGPS app to make 911 calls from a University campus. SirenGPS identifies the frequency of these calls as an escalated threat event and distributes the threat event to: University Dispatch, University Chief of Police, nearest University patrol officer; city Dispatch, city patrol officer, city battalion commander on duty; neighboring city of dispatch, neighboring city patrol officer, neighboring city battalion commander on duty for example at Washington University in St. Louis with neighboring city of Clayton. Additionally, when there is Multiple Stakeholder, Multiple Party Distribution of an Underlying Event a student uses the SirenGPS app to make a 911 call from a location within Washington University's campus. Subsequently, SirenGPS identifies the location of the call as implicating three distinct stakeholder interests by comparing the location of the call to geographic representations within each of the stakeholder SirenGPS environments. This association triggers automatic distribution of an emergency call event to: Washington University Dispatch, Washington University Chief of Police, nearest Washington University patrol officer; City of St Louis Dispatch, City of St Louis patrol officer, City of St Louis battalion commander on duty; City of Clayton Secondary information source distribution is the model for cross referencing dynamic location associations to determine distribution of information across stakeholder interests explained in the previous examples can be used to integrate external sensors, systems and resources into the work-flow for discovering, responding to and communicating about emergencies. IP-camera feed may be tool involving cross referencing the location for an emergency event with available camera(s) geofence(s) to select the appropriate camera(s) to automatically select the appropriate camera feed(s) to be distributed with the Event. For example, when there are Multiple Stakeholders and Multiple Party Distribution of video feed(s) for an Event such as when a student uses the SirenGPS app to make a 911 call from a location within Washington University's campus. SirenGPS identifies the location of the call to be located within the geofences that define the viewing area for three nearby camera(s) that are accessible via the internet by comparing the location of the call to geographic representations of the camera viewing area(s). SirenGPS simultaneously identifies the location of the call as indicating three distinct stakeholder interests by comparing the location of the call to geographic representations within each of the stakeholder SirenGPS environments. This association triggers distribution of an emergency call event with the indicted camera feed(s) to:

Washington University Dispatch, Washington University Chief of Police, nearest Washington University patrol officer; City of St Louis Dispatch, City of St Louis patrol officer, City of St Louis battalion commander on duty; City of Clayton.

Sensor event distribution may occur when there are a variety of sensors relevant to emergency communication including traffic, motion/activity, heat, air quality, water quality, radiation levels, moisture, etc. The example above describes a process used to cross reference the location for a 911 caller's location with geofence(s) that define viewing area for available camera(s) to select the appropriate camera(s). The trigger event that initiates the distribution process in the example is the 911 call. The trigger event role in that example can be replaced with something other than an emergency call. The trigger and distribution process can then be applied to any geo-referenced event or source including: airborne contaminant sensor, water contaminant sensor, radiation sensor, gunshot detection, alarm system, door sensor, motion sensor, or distribution of a third party alert (weather, earthquake, etc.). System would allow administrator to create distribution model for delivery of the sensor data package based on one or a combination of Sensor Initiated Distribution Trigger and External Trigger for Distribution of Sensor Data.

During a Sensor Initiated Distribution Trigger the System allows creation of georeferenced definition of an area within which the system should monitor location associated sensors for a defined output parameter(s). If/When a sensor(s) within the defined area meets the defined trigger requirements, the data from the sensor(s) is distributed to mobile/ web services according to an administrator defined distribution list as an event. For example during a multiple stakeholder multiple party distribution of sensor feed(s) event such as when water quality sensors are deployed throughout a large area and made available to interested stakeholders. The city, university and an advocacy group each define the area appropriate to their interest and define a sensor reading that indicates water is contaminated as the trigger event. When the sensor indicates that the water quality has degraded and meets the criteria, the sensor output is distributed to various parties at each of the stakeholder entities.

During an External Trigger for Distribution of Sensor Data the system monitors external sources for geo-referenced events that can include emergency calls, emergency alerts, evacuation orders, etc. System processes these external events by comparing the georeferenced event location information to locations for available sensor(s). If/When the external event achieves, the data from the indicated sensor(s) is distributed to mobile/ web services according to an administrator defined distribution list. For example during a multiple stakeholder multiple party distribution of sensor feed(s) event such as when radiation sensors deployed throughout a large area and made available to stakeholders. The city, university and a first responder agency each define the geographic area appropriate to their interest. The federal government issues a warning of a radiation threat to a defined geographic area. SirenGPS compares the area identified in the threat warning to geographic areas associated communities. SirenGPS simultaneously compares the area identified in the threat warning with locations associated with sensors. Stakeholder location comparison indicates three distinct stakeholder interests. System distributes the emergency warning event along with output from indicted sensor feed(s) to: the city, university and the first responder agency.

Additional resource distribution can also be used as secondary information and/or resource(s) distribution upon positive cross reference of location associated with the information/resource and the location associated with a triggering event. Building schematic distribution may distribute building plans electronically upon a triggering event. This tool set contemplates creating a geofence defined by the geographic footprint of a given building and cross referencing the location defined by that geofence with a location based event to select the appropriate building plan/schematic(s) to be made part of the distribution of the triggering event. For example during a multiple stakeholder multiple party distribution of building schematic triggered by a distinct location event, such as when the city, university and a first responder agency each define the geographic area appropriate to their interest. A user makes an emergency call from a location that in all three stakeholder defined areas. SirenGPS compares the location identified in the emergency call event with all stakeholder defined areas and matches three stakeholders. System distributes the emergency call with indicated building schematics to: the city, university and the first responder agency. Another example of a building schematic distribution may occur from an area event such as when the city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System also compares the geographic area identified in NOAA's tornado warning with geographic areas associated with building schematics. System distributes the emergency alert with indicated building schematics to: the city, university and the first responder agency.

Similarly, emergency plan distribution may occur as emergency plans typically apply to specific geographic location(s) and include nuance related to the hazards, assets and other features of the location. This tool contemplates distributed of an emergency plan upon a triggering event based on comparisons of location from the triggering event and a defined geographic area associated with the emergency plan. An example emergency plan distribution triggered by a distinct location event may include when the city, university and a first responder agency each define the geographic area appropriate to their interest. A gunshot detection system indicates a firearm discharge at a location within all three stakeholder defined areas. SirenGPS compares the location identified by the gunshot detection event with all stakeholder defined areas and matches three stakeholders. System also compares the geographic area identified by the gunshot detection system with geographic areas associated with emergency plan(s) maintained by each of the stakeholders. System distributes the gunshot detection event with indicated emergency plan(s) appropriate to each stakeholder: the city, university and the first responder agency.

Additionally an emergency plan distribution triggered by an area event may occur when the city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System also compares the geographic area identified in NOAA's tornado warning with geographic areas associated with emergency plan(s) maintained by each of the stakeholders. System distributes NOAA's emergency alert with indicated emergency plans appropriate to each stakeholder: the city, university and the first responder agency.

An emergency plan distribution triggered by location and content of an area event may occur such as when the city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System compares the geographic area identified in NOAA's tornado warning with geographic areas associated with emergency plan(s) maintained by each of the stakeholders. System compares the content of NOAA's tornado warning to select appropriate emergency plan(s) maintained by each of the stakeholders. System distributes NOAA's emergency alert with indicated emergency plans appropriate to each stakeholder: the city, university and the first responder agency A checklist distribution includes a checklist defining tasks to be completed upon a specific trigger. The system allows an administrator to define a trigger event that will auto distribute a checklist to a distribution list upon the triggering event and automate completion/tracking of the task list by the recipient(s). System allows administrator to define a location for a checklist and cross referencing the location defined by that geofence with a location or content based event to select the appropriate checklist to be made part of the distribution of the event. An example checklist distribution triggered by a distinct location event may include the city, university and a first responder agency each define the geographic area appropriate to their interest. A 911 call is made from a location within all three stakeholder defined areas. SirenGPS compares the location identified by the emergency call event with all stakeholder defined areas and matches three stakeholders. System also compares the geographic area identified by the emergency call event with geographic areas associated with Check List(s) maintained by each of the stakeholders. System distributes the emergency call event with indicated Check List(s) appropriate to each stakeholder: the city, university and the first responder agency.

Additionally a checklist distribution triggered by an area event may occur when the city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System also compares the geographic area identified in NOAA's tornado warning with geographic areas associated with Check List(s) maintained by each of the stakeholders. System distributes NOAA's emergency alert with indicated Check List(s) appropriate to each stakeholder to: the city, university and the first responder agency.

A checklist distribution triggered by location and content of an area event may occur such as when the city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System compares the geographic area identified in NOAA's tornado warning with geographic areas associated with emergency plan(s) maintained by each of the stakeholders. System compares the content of NOAA's tornado warning to select appropriate emergency plan(s) maintained by each of the stakeholders. System distributes NOAA's emergency alert with indicated emergency plans appropriate each stakeholder to: the city, university and the first responder agency.

Contact list distributions include a contact list including information required to call or otherwise contact individuals. Contact Lists can be automatically assembled based on locations associated with an event, cross referenced with locations for individuals, or can be assembled by other means that may or not be related to a current Event. The system would allow an administrator to define a trigger event that will auto select/create and distribute a contact list to a distribution list upon a triggering event. System allows administrator to define a location for the Contact List and cross referencing the location defined by that geofence with a location or content based event to select the appropriate Contact List to be made part of the distribution of the event. The System makes this list available to the recipient for export, use within the System, or use in third party systems.

Examples of contact list distribution for a location event, area event and location and content of an area event include for a location event when the city, university and a first responder agency each define the geographic area appropriate to their interest. A gunshot detection system indicates a firearm discharge at a location within all three stakeholder defined areas. SirenGPS compares the location identified by the gunshot detection event with all stakeholder defined areas and matches three stakeholders. System also compares the geographic area identified by the gunshot detection system with geographic areas associated with Contact Lists (s) maintained by each of the stakeholders. System distributes the gunshot detection event with indicated Contact List(s) appropriate to each stakeholder to: the city, university and the first responder agency. For an area event when The city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System also compares the geographic area identified in NOAA's tornado warning with geographic areas associated with Contact List(s) maintained by each of the stakeholders. System distributes NOAA's emergency alert with indicated Contact List(s) appropriate to each stakeholder to: the city, university and the first responder agency. And for the location and content of an area event when The city, university and a first responder agency each define a geographic area appropriate to their interest. The National Oceanic and Atmospheric Administration (NOAA) puts out a tornado warning that includes geographic parameters for the area threatened by the storm. SirenGPS compares the geographic area identified in NOAA's tornado warning with all stakeholder defined areas and matches three stakeholders. System compares the geographic area identified in NOAA's tornado warning with geographic areas associated with Contact List(s) maintained by each of the stakeholders. System compares the content of NOAA's tornado warning to select appropriate emergency plan(s) maintained by each of the stakeholders. System distributes NOAA's emergency alert with indicated Contact List(s) appropriate to each stakeholder to: the city, university and the first responder agency.

As shown in FIG. 23, the UI display 131 optimizes location by showing the time required to complete location capture on mobile devices is highly variable within the time-frame required to execute an emergency call from a device, particularly if the device was "asleep" or powered down. Often hesitating for a couple of seconds will allow location capture to complete, dramatically improving the location quality. System displays time/function based information to the user as a graphic representation 114 on a mobile device that communicates the status of the location capture process. The purpose of the display is to encourage the user to allow sufficient time for the device to complete location capture before initiating an emergency call, where possible.

Additionally the UI display can be updated with emergency numbers 116 based on location 118 such as where the system updates mobile device emergency calling tools based on location. Device is populated with emergency calling numbers for Fire, Ambulance and Police services where these numbers are available. Numbers update based on location locally, nationally and globally. The system monitors device location to maintain display with the numbers associated with current location at all times. Numbers are displayed as buttons on mobile device emergency call screen 120. Using buttons on the emergency call screen initiates an autodial for the emergency number selected.

Accordingly, location updates are provided for emergency numbers where numbers available for emergency calling update as the device transitions to a new location. System monitors third party country associated information from telephone carrier, internet service provider and other access points. System can also use defined geographic reference locations for increased granularity below the national level to provide local numbers and to corroborate national identification. For example and as shown in FIGS. 24A and 24B emergency numbers in the program of the mobile computing device update as users enters a new country 118a where the system maintains local emergency calling numbers for every country in the world. A user starts on a trip to Egypt 118a" from the United States 118a'. In the United States the numbers 116a for emergency calling for Fire Service, Ambulance, and Police are all 911. The service populates these numbers while the user is in the United States. Upon arrival, the system detects that the mobile device is now located in Egypt where the numbers 116b for Fire Service, Fire Service and Police are "180", "123", and "122", respectively. The system updates the emergency calling numbers on the emergency call screen to "180", "123", and "122" as shown in FIG. 24B. Generally, the centralized emergency response computer system sends updated emergency responder contacts to the mobile computing device.

Similarly, emergency numbers update as a user enters a defined geographic area within a country, such as a city, county or similar localized area 118b, without national service such as in some areas no national emergency calling service is available. The system uses geographic definition of areas where no national number is available to populate alternative numbers to the emergency call screen. A user starts on a trip from within the United States to an area of rural Missouri without 911 service. In the United States the numbers for emergency calling for Fire Service, Ambulance, and Police are all 911. The service populates these numbers for the user until the user enters an area where 911 service is no longer available. Upon arrival in the defined geographic area the system detects that the mobile device is now located in an area where the numbers for Fire Service, Fire Service and Police are limited to local ten digit numbers.

Figure 25A:
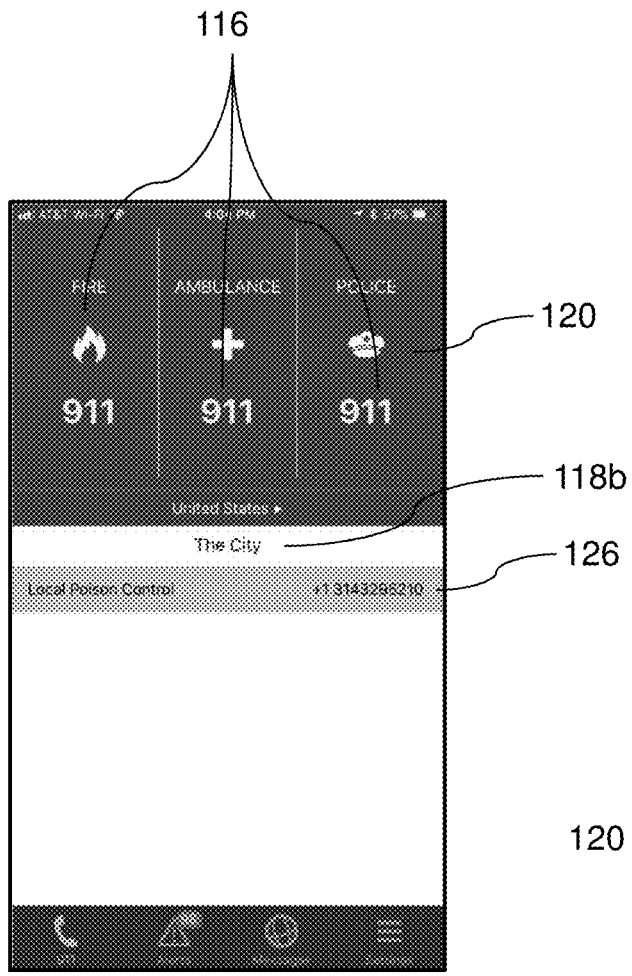
FIGS. 25A and 25B illustrate additional emergency and non-emergency numbers.
Figure 25B:
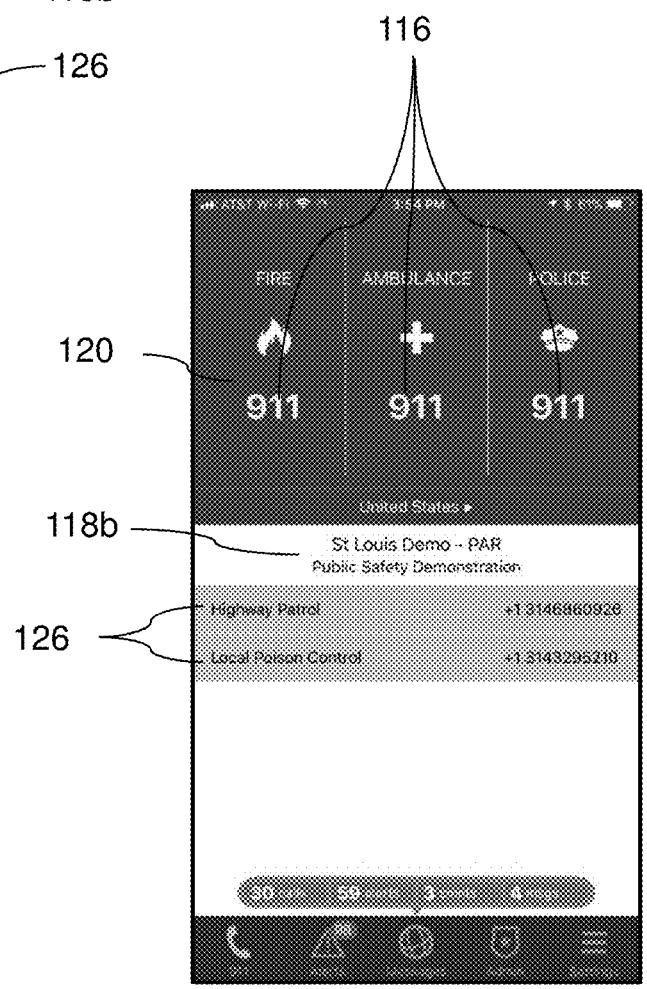

As shown in FIGS. 25A and 25B the system allows for definition of telephone number(s) that are auto populated to the emergency call interface for users based on association and/or proximity. These additional and nonemergency numbers 126 display as a button in the emergency call interface. When pressed, the button auto-dials the associated number. The system also distributes numbers by location where the System allows definition of a geographic area to be associated with a telephone number to display the number on the user's emergency call interface when the user's location is within the area defined for the number. For example, an additional number will appear based on location where a City defines the service area for a local poison control call center as a geofence in the system Community. The City enables a telephone number for the local poison control call center on the system. As a user enters the service area for the local poison control call center, the local poison control telephone number appears as a button on the emergency call interface.

Numbers may also distribute by proximity where the system allows definition of a geographic location for a telephone number to sort numbers on the user's emergency call interface based on the user's proximity to the location associated with the number. This may occur where The City, County and State all have system Communities with concentric overlapping geofences that define their respective geographic boundaries. Each of these entities enables a telephone number for motorist assistance and designates a location associated with the entity's respective number. A user is associated with all three entities as either a member or visitor as appropriate in each system Community. The three motorist assistance numbers appear as buttons on the emergency call interface. The three buttons appear in order of proximity by comparing the current location of the user and the locations associated with each of the motorist assistance numbers.

Similarly numbers may distribute by association where the system allows a telephone number to display on the user's emergency call interface based on a defined relationship. For example, when the City, County and State all have system Communities and each of these entities enables a motorist assistance number on the system. A user is a member of the City and County Communities, but is not a member of the State Community. The motorist assistance numbers for the City and State appear as buttons on the emergency call interface. The motorist assistance number for the State does not appear as a button on the emergency call interface.

A user can control location privacy where in the absence of the service mobile device user location anonymity is currently protected by limited third party visibility of location information and poor quality of location information available within current infrastructure. Evolving infrastructure technology will make location more accurate and more available, presenting a threat to personal privacy. To address the personal privacy issues associated with location sharing the system deploys a dashboard for users to manage connections and information sharing with granular options to enable/disable location sharing and emergency call event sharing globally and individually. System allows users to make decisions and choose whether and with whom to share information and to change settings based on preferences user can automatically share location by enabling visitor status, user can stop all sharing, limit sharing, and can manage sharing per each relationship.

The system is also interoperable between users such allowing membership in many communities: The system maintains virtual Communities that are defined to include users as members, those users who are persistently associated with the Community. Users may be members of any number of Communities. Users can manage their relationship with those Communities through the system. For example, Washington University, Barnes Jewish Hospital and the City of St Louis each sets up a Community with the system and allows citizens to become members. Users may choose to be a member of all, some or none of these Communities. User becomes a member of all three Communities.

Membership may also be location based as the system maintains virtual Communities that are defined to include users as visitors, those users who are joined to the Community through their presence in a geographic area associated with the Community. Visitor status allows users to transition from one Community to another as the user moves from a geographic area defined by one Community to a geographic area defined by another Community. Users may be a visitor in multiple Communities when located within a geographic area associated with more than one Community. User may transition from one Community to another by leaving a geographic area associated with one Community and entering a geographic area associated with another Community. As a user moves from a location within Community A to a location in Community B, location information from the user's device is used to remove the user from Community A and include that user in Community B and make the user available in Community B.

For example, Washington University, Barnes Jewish Hospital and the City of St Louis each sets up a Community with the system that allows for visitors. All three Communities define the geographic area associated with their respective Communities to include the Barnes Hospital campus. Users that enable Visiting have visitor status in all three Communities when they are located on the Barnes Hospital campus. In another example the City of Clayton and the City of Ladue share a border. Both cities set up a Community with the system that allows for visitors and define the geographic area associated with their respective municipal boundary. These geographic areas do not overlap. A user in Ladue has visitor status in Ladue. As the user crosses into Clayton the system removes the user as a visitor in Ladue and adds the user as a visitor in Clayton.

In the case of a visitor seeking emergency calls or text event distribution as long as the system settings align as between the Community and the user, the user is not required to take any additional action for the emergency calling tools to work when the user is located within an area defined by a Community. For example Washington University sets up a Community with the system that allows for visitors and chooses to receive Emergency Call/Text events when users initiate emergency calls/texts from defined geographic areas defined within the Washington University Community. A user who has no relationship with Washington University, but has enabled Visiting and is located on the Washington University campus. The user initiates an emergency call/text from within the area defined by Washington University. Washington University receives the Emergency Call/Text Event generated by the user's call/text event. In another example Washington University sets up a Community with the system that allows for visitors and chooses to receive Emergency Call/Text events when users initiate emergency calls/texts from defined geographic areas defined within the Washington University Community. A user who has no relationship with Washington University, and has disabled auto Visiting, initiates an emergency call/text from within the area defined by Washington University. Washington University does not receive an Emergency Call/Text Event. In another example Washington University sets up a Community with the system and chooses either not to receive Emergency Call/Text events, or only to receive those events when users who are members initiate emergency calls/texts from defined geographic areas defined within the Washington University Community. A user who has no relationship with Washington University, and has enabled auto Visiting, initiates an emergency call or text from within the area defined by Washington University. Washington University does not receive an Emergency Call/Text Event.

Emergency alert distribution based on visitor status, as long as the system settings align as between the Community and the user, the user is not required to take any additional action for the emergency alerting tools to work when the user is located within an area defined by a Community. For example Washington University sets up a Community with the system that allows for visitors and chooses to send emergency alert events to visitors in defined geographic areas within the Washington University Community. A user who has no relationship with Washington University, but has enabled Visiting is located on the Washington University campus. Washington University initiates an emergency alert sent to users located in defined area. The user receives the emergency alert. In another example Washington University sets up a Community with the system that allows for visitors and chooses to send emergency alert events to visitors in defined geographic areas within the Washington University Community. A user who has no relationship with Washington University, has disabled Visiting and is located on the Washington University campus. Washington University initiates an emergency alert sent to users located in the defined area. The user does not receive the emergency alert. Washington University sets up a Community with the system that allows for visitors and chooses to send an emergency alert to members in defined geographic areas within the Washington University Community. A user who has no relationship with Washington University, has enabled Visiting and is located on the Washington University campus. Washington University initiates an emergency alert sent only to users who are also members located in the defined area. The user does not receive the emergency alert.

Similarly the system is community interoperable where the system is built to allow organizations to share information, access, visibility and control of their emergency communications. Horizontal interoperability within the system allows client Communities to share administrative level access with other Client Communities. This is done to facilitate mutual aid partnership information and communication.

Sharing groups are designated segmentation of contact lists that correspond to system users with a shared relationship. Groups can be shared with another Community to allow the recipient organization to communicate with the individuals who are included in that group. For example the City of Clayton and the City of Ladue both have Special Weapons and Tactical (SWAT) units made up of law enforcement officers with specialized training and equipment. Clayton chooses to share the group Clayton SWAT with Ladue. Ladue now has access to the Clayton SWAT Group for communication and GIS integrated location tracking/depiction of Clayton's SWAT on a map. Clayton retains access to all functionality and control over curation of the Group.

Sharing visibility of emergency events exists as Geofences are graphic representations of a defined geographic area that can be manually or automatically created within a Community maintained on the system. Geofences can be shared with another organization to allow the recipient organization to observe emergency events that occur in that location. For example, the City of Clayton and the City of Ladue both have geofences that define the area(s) where these municipalities want to see an Emergency Call Event when someone calls 911. Clayton chooses to share geofences with Ladue for the purpose of allowing Ladue to receive Emergency Call Events from the Clayton geofence (s). Ladue now has access to view Emergency Call Events that occur in Clayton. Clayton retains access to all functionality and control over curation of the geofences.

Sharing communication capabilities also exist by location as geofences can be shared with another organization to allow the recipient organization to communicate with users who are associated with that location. For example, The City of Clayton and the City of Ladue both have defined geofences that define the area(s) where these municipalities can engage in location based communication with users associated with the location within the area defined by a geofence. Clayton chooses to share its geofences with Ladue for the purpose of allowing Ladue to engage in location based communication from the Clayton geofence(s). Ladue now has access to engage in location based communication using Clayton geofences. Clayton retains access to all functionality and keeps control over curation of the geofences.

Vertical interoperability also exists as credentials are built to allow administrative access to a Community to be shared "vertically" with a parent Community. This allows any administrator in the parent community to have administrative rights in the child community to view and manage any function available to the child Community. For example the City of Clayton and the City of Ladue both have system Communities they use to manage emergency communications. Clayton chooses to share access with Ladue for the purpose of allowing Ladue to have access to all functionality available to Clayton. Credentialed Ladue administrators now have the same rights to use and manage the Clayton Community.

Threat Information may also be distributed by localized feeds where automated analysis and distribution of threat information based on cross referencing the location associated with the threat and the location of users and/or Communities. Automated location based on emergency alert distribution occurs as the system processes communications and parses location from the communication. Location determination can be made via logic analysis or based on template and field communication structure. Location associated with the communication is then compared to locations for individuals to automate recipient list build and auto initiate distribution. For example, NOAA issues a tornado alert that includes a defined geographic area that is threatened by the tornado. The system compares the area defined in the tornado warning to all locations associated with users and distributes the tornado warning to indicated users. The system builds and distributes a report for any Communities that have designated a geographic area of interest that overlaps with the geographic area indicated in the tornado warning. The report identifies users who were associated with locations that are within both the Community's area and the area designated in the tornado warning.

Manual location-based emergency alert distribution occurs as the system is designed to consume risk information and turn it into emergency alerts by parsing location associated with the communication. Communication location is then compared to locations for individuals and also cross referenced with geographic boundaries associated with an organization that has an interest in emergency communication. Recipient list is built automatically based on organization rules from the coincidence of the organization location, individual locations, and the location associated with the communication. An event is shared with the organization administrators to review/send the alert. For example, NOAA issues a tornado alert that includes a defined geographic area that is threatened by the tornado. The system compares the area defined in the tornado warning to all locations associated with users to create a report that identifies users who are associated with locations that are within both the Community's area and the area designated in the tornado warning. The system then prepares a report and alert for any indicated Community based on the NOAA alert with a prebuilt recipient list. The system distributes the prepared Community alert and report to selected system administrators for all indicated Communities. System administrators who receive the prepared alert can release the tornado alert for distribution to included users.

Incident based alerting and automated censes occurs as creating a census is a standard emergency management process for developing situational awareness in large scale emergencies. The system is designed to integrate location and communication services to automate census collection and deliver this information in actionable interfaces. Manual census is performed as the System manages current location for all users through communication with mobile devices. System also maintains user managed location information that captures locations associated with those users. System administrator uses geofencing tool to define an area for census generation. System auto generates a report with contact information, current locations, home address and work address for individuals based on cross referencing the area indicated by the geofence and the locations associated with the individuals. For example, a Community alert is sent by a credentialed Community emergency manager to all member and visitor users warning them of a terror attack in Paris. System creates a census of all indicated users that includes last known location, contact information and up to date communication details in multiple formats. Census reports update in real time and are available for view/export. Community emergency manager in Chicago exports the census report and uses it to field phone calls from interested parties requesting status of the users who are included in the census.

Automatic incident censes occurs as the system manages current location for all users through communication with mobile devices. System maintains user managed location information that captures locations associated with those users. System processes third party information source that includes information sufficient to define a geographic area for census generation. System auto generates a report with contact information, current locations, home address and work address for individuals based on cross referencing the area indicated by the geofence and the locations associated with the individuals. For example, a Community alert is automatically sent to indicated member and visitor users warning them of a terror attack in Paris. The alert is generated by system analysis of a warning generated by the United States Department of State that includes information defining a geographic area for the terrorist threat. System creates a census report of all indicated users that are also members and/or visitors of any Communities for the indicated Communities. Census report includes last known location, contact information and up to date communication details in multiple formats. Census reports update in real time and are available for view/export. Community emergency manager in Chicago exports the census report and uses it to field phone calls from interested parties requesting status of the users who are included in the census.

The system has location integrated mass communication as the system integrates location services into many to many and many to one communications. System maintains a current location for users by communicating with mobile devices. When a user sends a communication into the system, this communication is displayed with latitude and longitude and address for the user's last known location at the time the communication is sent. Communication is also graphically placed on a GIS map. For example, a Community alert is sent to 85 student study abroad users warning them of a terror attack in Paris. The system attempts to capture a current location from the mobile devices for all recipients of the terror alert. As the students respond to the alert, the system associates the last known location for each user with their response and integrates these into the emergency communication by showing an address, latitude and longitude as text with messages, and graphically in a GIS mapping tool.

The system also uses multi-channel threading and telephone number-rotation as legacy mass notification systems send out mass text, email and automated calling using single numbers where possible. This is incompatible with the work-flow for mass emergency communication designed for two-way exchange of information. This is because it is not possible to track a response to the query the response is associated with where more than one query has been sent to the recipient/responder over a single number. SirenGPS system solves this problem by maintaining communication access over multiple numbers and tracking the numbers used for communication with any given individual. The system maintains a relationship between outbound query and associates relevant responses to the appropriate query. For example, A series of three Community alerts are sent to 85 student study abroad users warning them of a terror attack in Paris. The first alert provides an initial warning sharing information provided by the United States Department of State indicating a terror threat. This first alert requests a status from each recipient. A second alert is sent 3 minutes later transmitting an image of a suspected terrorist and a request from local authorities for information. The third alert, sent half an hour after the initial alert, provides an all clear and reiterates the request from local authorities. The students respond with their status with a median response time of 2.5 minutes and an average response time of 13 minutes. Approximately half of the status responses are received before the second alert is sent. Three status responses are sent after the third alert is sent. Six hours after the initial alert is sent, one of the students sees an individual matching the image that was sent in the second alert. That student responds to the second alert with information about the suspected terrorist. The system manages the use of telephone numbers for sending text messages so that none of the alerts are sent to the same user using the same telephone number. All of the responses from students providing their status are associated with the first alert request for their status. The response from the student providing information about the suspected terrorist is associated with the alert requesting that information.

The system also provides tactical benefits such as multi-device map based location display where the system simultaneously tracks unlimited number of mobile devices into a GIS mapping tool to provide a real-time graphic depiction of location, movement and relative position of users participating in a communication event. System maintains a last known location for all users indicated by extracting location from all indicated mobile devices. For example, The City Citizen Patrol Group deploys the service to provide communications for citizens who work with the city to provide "eyes on the street". A tactical exercise is initiated, sending multi-modal communication to members of the North Patrol Group, requesting participation in a group communication. Members of the North Patrol Group receive the communication and eleven individuals who are currently on a working shift accept the invitation. The System begins tracking all eleven participating citizen patrol users by depicting them in a map with a representation that identifies the individual and displays last know location with a pin drop for each individual. The map updates, with pin drops moving to track the movement of the participating citizen patrol participants as they perform their patrols.

Dynamic tracking is used where the system maintains a current location for all selected users by simultaneously communicating with all indicated mobile devices. Current location information updates in frequency based on speed of each individual user. When a user moves more quickly, the system updates that user's location at shorter intervals to maintain an accurate location. The system extracts speed from the mobile device where available and also calculates speed based on comparison of locations in sequence. Location update communications between mobile devices and the service are performed at a frequency based on the speed each individual user is moving. For example, the City Citizen Patrol Group deploys the service to provide communications for citizens who work with the city to provide "eyes on the street". Some members of the citizen patrol walk through the park during their shift. One member of the citizen patrol Group drives around the perimeter of the park in a vehicle. The rate of communication between the mobile device and the web services is faster for the citizen patrol member who is in a vehicle than it is for members who are walking through the park Multi-modal many-to-many location integrated communications are provided as multi-modal communications shared with unlimited number of devices in parallel with integrated location tracking services. For example, the City Citizen Patrol Group deploys the service to provide communications for citizens who work with the city to provide "eyes on the street". When a tactical communication event is initiated, all of the citizen patrol members indicated receive an invitation to participate in the communication event. Communications from all participating members sent over the service are shared with all of the other participating members. Each communication includes location information that shows where the member sending the message is located.

Filter selection is automated based on criteria where cross reference and filter for capabilities and location to search for nearest desired asset. For example, the City deploys the service to provide communications for first responders who provide law enforcement services for the City. A tactical communication event is currently running that includes law enforcement first responders. An Emergency Call event occurs that requests law enforcement services. The Emergency Call event indicates that the caller's primary language is Spanish. A request is submitted for the system to filter the current tactical communication event for participating first responders who have Spanish language proficiency indicated as part of their capabilities. The system highlights pin-drops to display the location for law enforcement officers with Spanish language proficiency in proximity to the location of the Emergency Call event.

Automated initiation of tactical communications are also provided by Combining the capability to auto generate participants based on location, capabilities and role, the system automatically initiates many to many location integrated communications in response to a trigger event. For example, the City deploys the service to provide communications for first responders who provide law enforcement services for the City. An Emergency Call event occurs that requests law enforcement services. The Emergency Call event indicates that the caller's primary language is Spanish. The system builds a recipient list of law enforcement first responders with Spanish language proficiency and initiates a tactical communication exercise. The tactical communication exercise starts by automatically sending a multimodal communication requesting participation. Five first responders with Spanish language proficiency respond to the request and are available. The system displays each of the five responding first responders in a map and highlights the pin-drops for these law enforcement officers. The highlighted pin-drops display the location for law enforcement officers with Spanish language proficiency in proximity to the location of the Emergency Call event.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents. The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method for automatically coordinating emergency responders using an emergency response computer system in operative communication with mobile computing devices for a set of device users, the method comprising:
   storing in a database of the emergency response computer system a plurality of geographic zones;
   correlating in the database a plurality of emergency groups having responsibility for the geographic zones, wherein each of the emergency groups is comprised of sets of emergency response units;
   storing in the database a history of location information for each one of the mobile communication devices in the set of devices users, wherein the history of location information includes a latest device location and a set of historical locations for a set of defined historical time intervals;
   periodically updating the database with the latest device locations for the mobile computing devices and setting the latest device location as a current location for each respective one of the mobile communication devices in the set of device users;
   receiving through a communications module in the emergency response computer system at a current time a mass emergency message for an emergency, wherein the emergency is associated with a geographic area and an event time in the mass emergency message, wherein the event time precedes the current time;
   determining in a computer processor of the emergency response computer system a first set of the geographic zones overlapping with the geographic area;
   determining in a computer processor of the emergency response computer system a set of device locations for a subset of mobile computing devices having operated within the geographic area during a predefined time period, wherein the predefined time period encompasses the event time and a period of time subsequent to the event time, wherein the computer processor queries the history of location information in the database for the mobile computing devices having at least one of the current location in the geographic area during the predefined time period or one of the historical locations in the geographic at one of the defined historical time intervals corresponding with the predefined time period;
   producing by the computer processor a report with the set of device locations;
   communicating the report through the communications module to a system user;
   communicating an emergency notice through the communications module the subset of mobile computing devices, wherein the emergency notice is associated with a first phone number;
   providing two-way communications between the subset of the mobile computing devices and the communications module in the emergency response computer system, wherein the two-way communications has a multi-channel threading with responses from the subset of computing devices back to the emergency notice are linked with the first phone number; and
   communicating a subsequent message to the subset of mobile communicating devices after the emergency notice with a status update, wherein the subsequent message is associated with a second phone number, and wherein responses from the subset of computing devices back to the subsequent message are linked with the second phone number in the multi-channel threading.

2. The method of claim 1, wherein the step of defining the geographic area is comprised of at least one of the steps of calculating a predetermined distance around a geospatial location for the emergency, receiving through the communications module a predetermined area from an authorized third party source, retrieving from the database a predefined zone or campus from an administrator, and receiving through a graphical interface of the emergency response computer system an ad hoc selected region.

3. The method of claim 1, wherein the step of determining the set of device locations for the subset of mobile computing devices is further comprised of the steps of:
   initiating a census of any mobile computing devices operating in at least one of the first set of the geographic zones and the geographic area at the current time when the mass emergency message is received by the communications module in the emergency response computer system;
   receiving a census record with currently operating mobile computing devices and the current location for each one of the currently operating mobile computing devices; and
   adding the census record to the subset of mobile computing devices having operated within the geographic area during the predefined time period.

4. The method of claim 1, further comprising the step of requesting in the emergency notice at least one of a status update and an incident report from the subset of mobile computing devices.

5. The method of claim 1, further comprising the steps of:
   initiating a plurality of census inquiries of any mobile computing devices being within, having entered, or having departed at least one of the first set of the geographic zones and the geographic area at a sequence of times following the current time when the mass emergency message is received by the communications module; and
   repeating the determining step, the producing step, and the communication step for each one of the census inquiries, wherein an updated set of device locations results from each repeated determining step, an updated reported results from each repeated producing step, and the updated report is communicated to the system user for each repeated communication step.

6. The method of claim 1, further comprising the step of communicating an emergency warning through the communications module to the subset of mobile computing devices, wherein the step of producing the report is further comprised of providing sets of user profile information with the set of device locations, and wherein the user profile information in the report includes a name and a phone number for each one of the device users and their corresponding mobile computing devices, respectively.

7. The method of claim 1, further comprising the steps of:
   storing in the database a set of first level of emergency response units and a set of second level of emergency response units for at least one of the emergency groups;
   identifying in the computer processor a set of emergency response units having responsibility for the first set of geographic zones within at least a portion of the geographic area;
   correlating further in the database a first set of emergencies associated with the first level of emergency response units, a second set of emergencies associated with the second level of emergency response units, and a third set of emergencies associated with the first level of emergency response units and the second level of emergency response units, wherein the first level of emergency response units and the second level of emergency response units each have geographic zones covering at least a portion of the geographic area;
   determining in the computer processor that the mass emergency message is from an authorized third party source and a content of the mass emergency message is a match to one of the first set of emergencies, the second set of emergencies, and the third set of emergencies; and
   identifying by the computer processor the set of emergency response units to receive the report according to the determined match.

8. A method for automatically coordinating emergency responders using an emergency response computer system in operative communication with mobile computing devices for a set of device users, the method comprising:
   storing in a database of the emergency response computer system a set of first level of emergency response units and a set of second level of emergency response units for a first geographic area;
   correlating in the database a set of emergency conditions with the first level of emergency response units and the second level of emergency response units, wherein the emergency conditions are comprised of a set of predetermined trigger words in the emergency messages, a predetermined distance between locations associated with the emergency messages, and a predetermined frequency of emergency trigger messages set as a trigger limit between the first level of emergency response units and the second level of emergency response units;
   receiving through a communications module in the emergency response computer system a number of emergency trigger messages during a period of time, wherein each one of the emergency trigger messages comprises an emergency message content and a mobile computing device location;
   defining in the emergency response computer system a message time for each of the received emergency trigger messages;
   determining in a processor of the emergency response computer system at each message time an event frequency from the received emergency trigger messages which have matches between the set of predetermined trigger words and the emergency message content in the emergency trigger messages and which also have distances between the mobile computing device locations within the predetermined distance;
   identifying in the processor only the first level of emergency response units when the event frequency is less than the predetermined frequency for the trigger limit;
   identifying in the processor both the first level of emergency response units and the second level of emergency response units when the event frequency is greater than the predetermined frequency for the trigger limit;
   correlating in the database a set of video cameras according to a corresponding set of footprint view locations within the first geographic area, wherein the video cameras have live video feeds available to the emergency response computer system through a distributed communications network;
   determining in the computer processor a subset of the video cameras with footprint view locations proximate to the mobile computing device locations; and
   relaying through the emergency response computer system the live video feeds to at least the set of first level of emergency response units.

9. The method of claim 8, wherein a first administrator is assigned to the set of first level of emergency response units for the first geographic area in the emergency response computer system, wherein a second administrator is assigned to the set of second level of emergency response units for a second geographic area in the emergency response computer system, wherein the first administrator has authorization in the emergency response computer system to assign the set of first level of emergency response units to a second level response for the second geographic area, and wherein the set of second level of emergency response units for the first geographic area are assigned a first level response for the second geographic area by the second administrator.

10. The method of claim 9, wherein the first geographic area is adjacent to the second geographic area, wherein only the first administrator is notified when the event frequency is less than the predetermined frequency for the trigger limit, and wherein both the first administrator and the second administrator are notified when the event frequency is greater than the predetermined frequency for the trigger limit.

11. The method of claim 9, wherein the set of first level of emergency response units for the first geographic area is selected from units of a local police department, and wherein the set of second level of emergency response units for the first geographic area is selected from units of at least one of county-level units and state-level units.

12. The method of claim 9, further comprising the steps of:
correlating in the database a set of authorized third party sources for mass emergency messages corresponding to mass events;
determining in the computer processor an emergency trigger message is received from at least one of the authorized third party sources and has a mass emergency message for a mass event associated with the first geographic area and the second geographic area;
identifying in the computer processor both the set of first level of emergency response units and the set of second level of emergency response units as the responsible set of emergency response units for the mass event;
determining in the computer processor a set of device locations for a subset of mobile computing devices having operated within the first geographic area and the second geographic area during a predefined time period;
producing by the computer processor a report with the set of device locations;
communicating the report through the communications module to the responsible set of emergency response units; and
communicating an emergency warning for the emergency event through the communications module to the set of mobile computing devices.

13. The method of claim 12, wherein the report is further comprised of instructions corresponding to the emergency warning for the emergency event and sets of user profile information with the set of device locations, wherein the user profile information in the report includes a name and a phone number for each one of the device users and their corresponding mobile computing devices, respectively, wherein the report sent to the set of first level of emergency response units is prioritized to identify device users with mobile computing device locations within the first geographic area, and wherein the report sent to the set of second level of emergency response units is prioritized to identify device users with mobile computing device locations within the second geographic area.

14. The method of claim 12, further comprising the step of correlating in the database a set of external electronic monitoring systems for an integrated system providing a feed of sensor information, wherein the authorized third party sources are comprised of the U.S. Federal Emergency Management Agency, the U.S. State Department, the U.S. Geological Survey, the U.S. Centers for Disease Control (CDC), the National Oceanic and Atmospheric Administration (NOAA), and the U.S. Food and Drug Administration (FDA), and wherein the external electronic monitoring systems are comprised of at least one of a fire alarm, traffic sensors, motion sensors, heat sensors, air quality sensors, water quality sensors, radiation sensors, and moisture sensors.

15. A method for automatically coordinating emergency responders using an emergency response computer system in operative communication with mobile computing devices for a set of device users, the method comprising:
storing in a database of the emergency response computer system a plurality of geographic areas and a plurality of emergency groups having responsibility for the geographic areas, wherein each of the emergency groups is comprised of sets of emergency response units, and wherein each of the geographic areas has a plurality of geographic zones;
correlating in the database a set of video cameras according to a corresponding set of footprint fields of view within the geographic areas, wherein the video cameras have live video feeds available to the emergency response computer system through a distributed communications network;
receiving through a communications module in the emergency response computer system an emergency trigger message, wherein the emergency trigger message comprises an emergency message content and a mobile computing device location;
determining in a processor of the emergency response computer system at least one of the video cameras with a footprint field of view proximate to the mobile computing device location;
displaying on a graphical interface of the emergency response computer for a system user the live video feed with the mobile computing device location;
correlating in the database a set of emergency conditions with a first level of emergency response units and a second level of emergency response units, wherein the emergency conditions are comprised of a set of predetermined trigger words in the emergency messages, a predetermined distance between locations associated with the emergency messages, and a predetermined frequency of emergency trigger messages set as a trigger limit between the first level of emergency response units and the second level of emergency response units;
receiving through the communications module a number of emergency trigger messages during a period of time, wherein each one of the emergency trigger messages comprises an emergency message content and a mobile computing device location;
defining in the emergency response computer system a message time for each of the received emergency trigger messages;
determining in the processor at each message time an event frequency from the received emergency trigger messages which have matches between the set of predetermined trigger words and the emergency message content in the emergency trigger messages and which also have distances between the mobile computing device locations within the predetermined distance;

relaying the live video feed to only the first level of emergency response units when the event frequency is less than the predetermined frequency for the trigger limit; and relaying the live video feed to both the first level of emergency response units and the second level of emergency response units when the event frequency is greater than the predetermined frequency for the trigger limit.

16. The method of claim 15, further comprising the steps of:

determining in the processor at least one of the emergency response units in a geographic zone according to the message content which encompasses the mobile computing device location;

relaying through the emergency response computer system the live video feed with the mobile computing device location to the at least one of the emergency response units in the geographic zone;

receiving in the computer processor from the system user through the graphical interface an ad hoc geographic region; and determining in the computer processor a corresponding subset of video cameras with footprint fields of view within the ad hoc geographic region.

17. The method of claim 15, further comprising the steps of:

correlating in the database a subset of geo-fenced video cameras with remote control by the emergency response computer system through the distributed communications network; and controlling at least one of the geo-fenced video cameras by the emergency response computer system with control.

18. The method of claim 15, further comprising the steps of:

correlating in the database sets of emergency terms with the emergency groups, wherein the emergency groups are comprised of a police department, a fire department, and an emergency medical service, wherein a first set of emergency terms corresponds to the police department, wherein a second set of emergency terms corresponds to the fire department, and wherein a third set of emergency terms corresponds to the emergency medical service; and comparing the emergency message content in the computer processor with the sets of emergency terms in the database to identify at least one of the corresponding emergency groups associated with the emergency trigger message.

19. The method of claim 1, further comprising the step of sending in at least one of the emergency notice and the subsequent message at least one of an all clear message, a terrorist alert, and an evacuation order to the subset of mobile communicating devices, wherein the all clear message is sent to the subset of mobile communicating devices for a set of students in a study abroad program, wherein the terrorist alert is sent to the subset of mobile communication devices for anyone in the geographic area associated with a terrorist attack and requests information on a suspected terrorist, and wherein the evacuation order is directed to the subset of mobile communicating devices in the geographic area associated with dangerous weather and includes information on an evacuation plan.

20. The method of claim 1, further comprising the steps of:

correlating in the database a set of video cameras according to a corresponding set of footprint view locations within the geographic area, wherein the video cameras have live video feeds available to the emergency response computer system through a distributed communications network;

determining in the computer processor a subset of the video cameras with footprint view locations proximate to the mobile computing device locations; and relaying through the emergency response computer system the live video feeds to at least the set of first level of emergency response units.

* * * * *